United States Patent
Olson et al.

(10) Patent No.: US 7,799,527 B2
(45) Date of Patent: Sep. 21, 2010

(54) SYSTEMS AND METHODS FOR AUTOMATED QUALITY CONTROL OF POLYMER SYNTHESIS

(75) Inventors: Nels A. Olson, San Diego, CA (US); Bahram Ghaffarzadeh Kermani, San Diego, CA (US); Hongji Ren, San Diego, CA (US); Theo Kotseroglou, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 494 days.

(21) Appl. No.: 11/173,952

(22) Filed: Jul. 1, 2005

(65) Prior Publication Data

US 2007/0003941 A1    Jan. 4, 2007

(51) Int. Cl.
*C12Q 1/68*    (2006.01)
*G01N 33/53*    (2006.01)
*C07H 21/02*    (2006.01)
*A61K 38/00*    (2006.01)
*C07K 1/00*    (2006.01)

(52) U.S. Cl. ............................ 435/6; 435/7.1; 536/23.1; 530/300; 530/350

(58) Field of Classification Search .................... 435/6, 435/7.1, 91.1, 91.2, 183; 436/94; 536/23.1; 530/300, 350
See application file for complete search history.

(56) References Cited

U.S. PATENT DOCUMENTS 6,019,896 A    2/2000    Mansfield et al.

OTHER PUBLICATIONS

Gong, X. et al., "An Absorption Detection Approach for Multiplexed Capillary Electrophoresis Using a Linear Photodiode Array," Analytical Chemistry, 71:4989-4996 (1999).

Gong, X. et al., "Genetic typing and HIV-1 diagnosis by using 96 capillary array electrophoresis and ultraviolet absorption detection," Journal of Chromatography B, 741(1):15-21 (2000).

Ma, L. et al., "Combinatorial Screening of Enzyme Activity by Using Multiplexed Capillary Electrophoresis," Analytical Chemistry, 72(14):3383-3387 (2000).

Olson, N. et al., "DNA profiling by capillary array electrophoresis with non-covalent fluorescent labeling," Journal of Chromatography A, 1051:155-160 (2004).

MCE Manager © User Manual, Instrument Control and Data Analysis Software for use with the CombiSep MCE 2000™ System, Version 2.0H, pp. 1-31, 2002, [disk].

MegaBACE Manual, Chapter 4, Electrophoresis Run Paramaters, pp. 1-7, [online], [retrieved on Dec. 19, 2005]. Retrieved from the Amersham Biosciences website using internet <URL: http://amershambiosciences.com/applic/upp00738.nsf/vLookupDoc/159450791-F640/$file/MegaManualChapter4.PDF>.

MSPREPRODEMO Preprocessing of raw mass spectrometry data, pp. 1-13, [online], [retrieved on Dec. 19, 2005]. Retrieved from the Mathworks website using internet <URL: http://mathworks.com/products/demos/bioinfo/massspec_prepro/msreprodemo.html>.

*Primary Examiner*—Frank W Lu

(57) ABSTRACT

The invention provides systems and methods for evaluating synthetic reactions such as polymer synthesis reactions. Evaluation of a synthetic reaction product can be based on a quantitative measure of synthesis such as coupling efficiency or yield, and various parameters determined from a separation record obtained for the synthetic reaction product. The invention further provides methods for evaluating a separation method based on various parameters determined from a separation record. The invention can be used to select an appropriate treatment for a synthetic reaction product such as a separation treatment or treatments related to further processing for the desired product. The methods are particularly useful for automated selection of treatments for synthetic reaction products.

19 Claims, 7 Drawing Sheets

A

B

SYSTEMS AND METHODS FOR AUTOMATED QUALITY CONTROL OF POLYMER SYNTHESIS

BACKGROUND OF THE INVENTION

This invention relates generally to analytical chemistry, and more specifically to quality assessment of polymer synthesis reactions, such as oligonucleotide synthetic reactions.

Oligonucleotides are among the most ubiquitous reagents used in biotechnology laboratories engaged in research, diagnostics and therapeutics. The high demand for oligonucleotides derives from their exquisite specificity for complementary nucleotide sequences in DNA or RNA molecules obtained from biological samples. This specificity allows oligonucleotides to be used as probes to identify a unique sequence present in less than part-per-billion abundance, for example, in order to provide a diagnosis for an individual at risk for a particular disease. Furthermore, this specificity also forms the basis for use of oligonucleotides as reagents for synthesizing molecules of DNA or RNA having a particular nucleotide sequence of interest. For example, a gene sequence associated with a particular disease can be cloned by hybridizing one or more oligonucleotides to the gene sequence and performing an amplification reaction to make multiple copies of the sequence. The cloned gene sequence can subsequently be utilized for research into the disease or can even be used for therapeutic treatment of individuals afflicted with the disease.

A variety of synthetic methods useful for producing oligonucleotides at various production rates are known in the art. Synthetic throughput can range from a production rate of just a few oligonucleotides per day, for example, by a small research lab making its own oligonucleotide reagents, to over 17 million oligonucleotides per year, for example, by a manufacturing facility providing commercial oligonucleotides to a worldwide market. Typical oligonucleotide synthetic methods are relatively robust being capable of handling oligonucleotides of varying length from just a few nucleotides per molecule to over 100 nucleotides per molecule. Furthermore, the methods are capable of producing oligonucleotides having a myriad number of different sequences, the complexity of which is illustrated by the fact that the number of different decamers (molecules having 10 nucleotides) that can be made using just the 4 common DNA nucleotides (A, T, C and G) is $4^{10}=1,048,576$.

Although currently available synthetic methods allow large numbers of oligonucleotides to be synthesized in a short period of time, the time and resources currently required for performing quality assessment typically impose a bottleneck on the overall rate of oligonucleotide production. Traditional methods of assessing the purity and sequence constitution of oligonucleotides include analytical techniques such as mass spectroscopy, capillary electrophoresis, UV absorbance spectroscopy and slab gel electrophoresis, which typically require manual implementation and/or evaluation by trained technicians. The desire to produce oligonucleotides at a rapid rate and at low cost to satisfy the ever increasing demand while staying competitive in the marketplace can increase pressure on manufacturers to minimize use of such methods to the point that quality assessment is based on a subset of reactions that is too small to be sufficiently representative of the manufacturers output. In some cases the pressure may lead to avoidance of empirical quality assessment, relying instead on theoretical or supposed robustness of the manufacturing process. However, such shortcuts in quality assessment place the burden on the end user to either evaluate the reaction product independently or risk reagent failure in an important experiment or procedure. The risk of reagent failure can be quite large and, in some cases, unacceptable.

Thus, there exists a need for efficient methods to assess quality of oligonucleotide synthetic reactions including, for example, methods that can be readily automated. The present invention satisfies these needs and provides other advantages as well.

BRIEF SUMMARY OF THE INVENTION

The invention provides a method of evaluating treatment for a desired polymer species, wherein a separation record for a polymer synthesis reaction product is provided and wherein the separation record includes a baseline and at least one peak corresponding to the desired polymer species. The method can include the automated steps of: (a) evaluating the baseline and optionally adjusting the baseline, thereby providing a baseline evaluated separation record; (b) identifying, in the baseline evaluated separation record, the at least one peak corresponding to the desired polymer species; (c) determining a quality metric for the desired polymer species based on a plurality of parameters of the baseline evaluated separation record, the parameters including signal-to-noise of the at least one peak, and retention of the at least one peak; (d) determining coupling efficiency for the desired polymer species; and (e) selecting at least one treatment from a plurality of alternative treatments for the desired polymer species, wherein the at least one treatment is selected based on the quality metric and the coupling efficiency, wherein the plurality of alternative treatments are correlated with different quality metrics and coupling efficiencies.

Also provided is a method of evaluating treatment for a plurality of desired polymer species, wherein separation records for a plurality of polymer synthesis reaction products are provided and wherein the separation records each include a baseline and at least one peak corresponding to the desired polymer species. The method can include the automated steps of: (a) evaluating each of the baselines and optionally adjusting the baselines, thereby providing a plurality of baseline evaluated separation records; (b) identifying, in each of the baseline evaluated separation records, the at least one peak corresponding to the desired polymer species; (c) determining a quality metric for each of the desired polymer species based on a plurality of parameters of each of the baseline evaluated separation records, the parameters including signal-to-noise of the at least one peak, and retention of the at least one peak; (d) determining coupling efficiency for each of the desired polymer species; and (e) selecting at least one treatment from a plurality of alternative treatments for each of the desired polymer species, wherein the at least one treatment is selected based on the quality metric and the coupling efficiency, wherein the plurality of alternative treatments are correlated with different quality metrics and coupling efficiencies.

An automated laboratory information management system, including at least one signal detector configured to detect a polymer synthesis reaction product, at least one computer processing unit and at least one instrument configured to treat a desired polymer species, wherein the at least one signal detector is configured to communicate a separation record for the reaction product to the at least one computer processing unit, wherein the at least one computer processing unit is configured to control a function of the at least one instrument, and wherein the at least one computer processing unit includes commands for: (a) obtaining the separation record from the at least one signal detector; (b) evaluating the baseline for the separation record and optionally adjusting the baseline, thereby providing a baseline evaluated separation record; (c) identifying at least one peak of the baseline evaluated separation record corresponding to the desired polymer species; (d) determining a quality metric for the desired polymer species based on a plurality of parameters of the baseline evaluated separation record, the parameters including signal-to-noise of the at least one peak, and retention of the at least one peak; (e) determining coupling efficiency for the desired polymer species; (f) selecting at least one treatment from a plurality of alternative treatments for the desired polymer species, wherein the at least one treatment is selected based on the quality metric and the coupling efficiency, wherein the plurality of alternative treatments are correlated with different quality metrics and coupling efficiencies; and (g) directing the instrument to perform the at least one treatment.

DETAILED DESCRIPTION OF THE INVENTION

Figure 1:
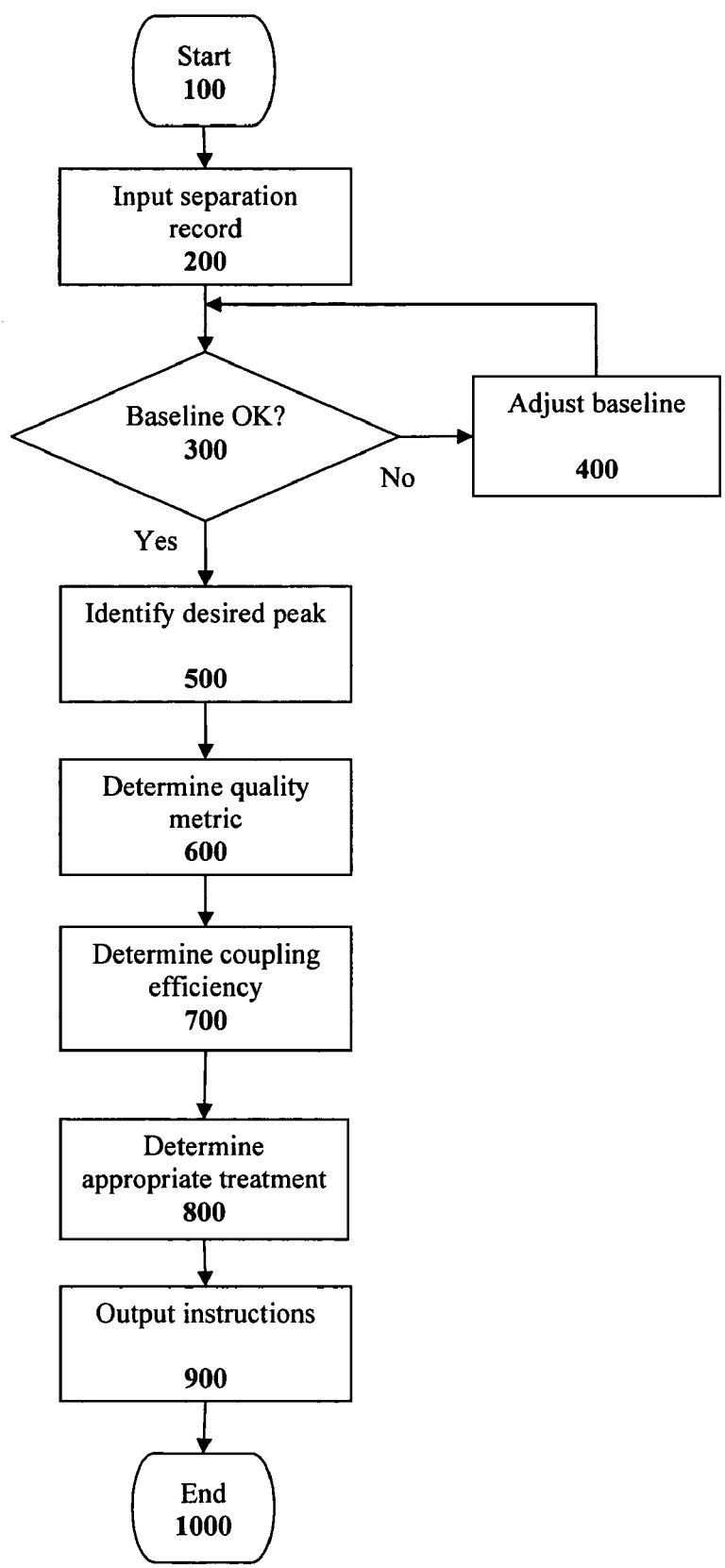
FIG. 1 shows a flowchart for a method of determining appropriate treatment for a polymer.

This invention provides methods and compositions that are useful for evaluating the product of a synthetic reaction. Data obtained from separation of a reaction product via one or more analytical methods, such as capillary electrophoresis, can be evaluated for a variety of parameters that are indicative of the quality or composition of the reaction product. Separation data of the type useful in the invention provide a myriad number and type of parameters that are useful for characterizing a reaction product to varying degrees. Different parameters can provide information about different characteristics of a reaction product such that increasing the number of parameters evaluated can increase the completeness of the characterization or confidence in the characterization or both. However, as the number of parameters increases, so does the amount of time and resources required to make an evaluation. The present invention is based on identification of sets of such parameters that can be used to efficiently determine quality, composition or other properties of the reaction products from polymer syntheses or other chemical reactions. The invention can be used for analysis and evaluation of the health of a synthetic processes as well as the health of separation instruments used to analyze the synthetic reaction products.

A set of parameters provided by the invention can be used for automated evaluation of reaction products and automated decision making regarding further treatment or processing of the reaction products. Accordingly, the invention provides automated methods and systems that can be used to evaluate separation records and make decisions, with little or no human intervention. A particular advantage of the automation is a reduction in the time and resources required for evaluation and decision making vis á vis manual methods, thereby increasing efficiency and throughput for the production of polymers or other synthetic compounds. A further advantage is that by providing objective criteria for evaluating properties of a reaction product, such as yield, purity or composition, the invention provides for a reduction in errors and inconsistencies that can arise from subjective human interpretation of separation results. Accordingly, the invention can lead to more consistent and accurate decision making with regard to further treatment or processing of a reaction product vis á vis manual methods. The advantages of the automated embodiments of the invention increase as the number of reactions to be processed increases because the automated methods require a smaller increase in labor requirements, compared to manual methods, and the automated methods are robust being capable of handling the repetitious nature of the analyses whereas manual methods can suffer higher error rates when the number of repetitious analyses to be performed increases.

In accordance with the invention, a separation record can be stored in an archive such as a computer readable memory. Furthermore, information related to a particular reaction product or separation record can be stored in the archive. Exemplary information that can be stored includes a parameter or quality metric determined from a separation record or a decision regarding treatment for a reaction product. Such information can be further evaluated to identify characteristics of a synthetic method or separation method. Archived information can also be evaluated in order to characterize an algorithm of the invention. Such characterizations can be useful for improving a method or algorithm of the invention. For example, an algorithm for evaluating treatment of a polymer can be characterized with respect to trends in separation data and polymer product quality and, if any systematic errors are found, then the algorithm, synthesis method or separation method, or combination thereof, can be modified for improved results. An advantage of an archive of the invention is that subtle effects of signal processing, including those that run counter to accepted concepts of signal processing can be identified and utilized for improvement efforts. More specifically, an archive of the invention can provide the advantage of a historical perspective on data and trends in the data, such as systematic errors, that are not typically available using human subjective analysis alone. Using archived information, algorithm modifications can be made and data obtained using an older version of the algorithm can be re-analyzed to ensure that appropriate techniques are being used for quality analysis.

A further advantage of the methods is that a standard compound need not be co-introduced with a synthetic reaction product during separation analysis in order to determine the quality of the synthetic reaction product or the quality of the separation method. Rather, the methods and systems set forth herein can be used to determine quality based on parameters of the synthetic reaction product in the absence of a co-introduced standard. However, the methods and systems described herein are sufficiently versatile and robust that, if desired, a standard can be co-introduced with a synthetic reaction product during separation analysis and used to determine a quality metric or otherwise determine how to treat the reaction product.

Definitions

As used herein, the term "automated" is intended to mean capable of functioning without human intervention. It will be understood that automation refers to the functioning of a method or step in a method whether or not the method was created by human intervention. Thus, a method or step that is created by human intervention such that it subsequently functions without human intervention is considered to be automated with respect to that function.

As used herein, the term "separation record" is intended to mean data representing signals indicative of at least one property of one or more molecular components of a sample as a function of a separation path for the sample. A separation path can be represented in a separation record using any of a variety of measures known in the art including, for example, time, such as retention time for an analyte in a chromatographic medium prior to passing a detector; volume, such as the volume of liquid phase that has passed through a solid phase at the point that an analyte passes a detector; or distance, such as the distance that an analyte has traveled in a separation medium. Signals in a separation record can be represented in any appropriate units for a particular detection method including, for example, absorbance units, volts, amps, arbitrary units or counts. The data can be represented, for example, in tabular form, graphical form or in a form readable by a computer. Exemplary separation records useful in the invention include, but are not limited to, a chromatogram, mass spectrum or electropherogram.

As used herein, the term "peak" is intended to mean a collection of signals forming a feature in a separation record that is indicative of the presence of an analyte. Typically, a peak corresponds to a single species of analyte in a separation. However, it is possible for two or more species of analyte to co-migrate in a separation to form an apparent peak corresponding to the two or more species. The term is intended to be consistent with its meaning in the arts related to chromatography.

As used herein, the term "baseline" is intended to mean a representation of a curve or line in a separation record that serves as a basis for evaluating one or more characteristics of a peak. A baseline of a separation record, such as a chromatogram, typically represents background signal detected or expected to be detected for the mobile phase in a separation.

As used herein, the term "reaction product," when used in reference to a polymer synthesis, is intended to mean one or more compounds that are present following contact between two or more monomers. A reaction product can include, for example, a desired polymer, undesired side product such as an undesired polymer, or one or more reactants such as a monomer, solvent or combination thereof. A reaction product need not include a desired polymer, for example, if a synthesis fails. Accordingly, a reaction product can include one or more compounds that are present following contact between two or more monomers under conditions believed or desired to produce a particular polymer.

As used herein, the term "polymer" is intended to mean a molecule having a continuous covalent structure made up of 2 or more repeating units. The term encompasses a homopolymer having a repeating unit of one species of monomer subunit. The term also encompasses a heteropolymer in which the repeating units are substructures of monomer subunits. Such substructures can form a backbone or other repeating structure such that individual monomer subunits present in the polymer can differ from each other. The term "polymer," as used herein, is intended to be consistent with its use in the chemical arts. Exemplary polymers useful in the invention include, but are not limited to, nucleic acids, also referred to as oligonucleotides or polynucleotides; proteins, also referred to as peptides, polypeptides or oligopeptides; or sugars, also referred to as oligosaccharides, polysaccharides or saccharides. A polymer can include, for example, at least about 2, 3, 4, 5, 6, 7, 8, 9, 10, 15, 20, 25, 50, 100, 1000, 10,000, 100,000 or more repeating units. If desired, a polymer used in the invention can have a maximum length including, for example, at most about 100,000, 10,000, 1000, 100, 10, 5 or fewer repeating units. A "species" of polymers is understood to be a group of polymers that all have the same sequence of monomeric subunits and molecular weight.

A polymer of a particular length can be referred to as an N-mer, wherein N is the number of repeating units in the polymer. Thus, a 25-mer oligonucleotide will be understood to be an oligonucleotide having 25 bases. The length of a particular polymer can be indicated as N-X, wherein N is the length of a reference polymer and X is the number of units missing in the particular polymer when compared to the number of repeating units in the reference polymer. For example, an N−1 side product from a reaction intended to produce a 25-mer oligonucleotide species will be understood to be a 24-mer oligonucleotide species.

As used herein, the term "nucleic acid" is intended to mean polymer molecule composed of subunits having purine or pyrimidine bases. The term is intended to be synonymous with the terms "oligonucleotide" and "polynucleotide." The terms are intended to include chains having any possible number of bases, unless explicitly indicated otherwise. Accordingly a nucleic acid can include a single linear chain having at least about 2, 3, 4, 5, 6, 7, 8, 9, 10, 15, 20, 25, 50, 100, 500 or more bases. If desired, a nucleic acid useful in the invention can have a maximum length including, for example, at most about 500, 100, 50, 10, 5 or fewer in a linear chain.

A nucleic acid useful in the present invention will generally contain phosphodiester bonds, and can include, for example, DNA, such as genomic DNA (gDNA) or copy DNA (cDNA); RNA such as messenger RNA (mRNA), transfer RNA (tRNA) or ribosomal RNA (rRNA); or a hybrid containing any combination of deoxyribo- and ribo-nucleotides. If desired to suit a particular application, DNA or RNA analogs having alternate backbones can be used, including, for example, phosphoramide (Beaucage et al., *Tetrahedron* 49(10): 1925 (1993) and references therein; Letsinger, *J. Org. Chem.* 35:3800 (1970); Sprinzl et al., *Eur. J. Biochem.* 81:579 (1977); Letsinger et al., *Nucl. Acids Res.* 14:3487 (1986); Sawai et al, *Chem. Lett.* 805 (1984), Letsinger et al., *J. Am. Chem. Soc.* 110:4470 (1988); and Pauwels et al., *Chemica Scripta* 26:141 91986)), phosphorothioate (Mag et al., *Nucleic Acids Res.* 19:1437 (1991); and U.S. Pat. No. 5,644, 048), phosphorodithioate (Briu et al., *J. Am. Chem. Soc.* 111: 2321 (1989), O-methylphosphoroamidite linkages (see Eckstein, *Oligonucleotides and Analogues: A Practical Approach*, Oxford University Press), or peptide nucleic acid linkages (see Egholm, *J. Am. Chem. Soc.* 114:1895 (1992); Meier et al., *Chem. Int. Ed. Engl.* 31:1008 (1992); Nielsen, *Nature,* 365:566 (1993); Carlsson et al., *Nature* 380:207 (1996), all of which are incorporated by reference). Other nucleic acids include those with positive backbones (Denpcy et al., *Proc. Natl. Acad. Sci. USA* 92:6097 (1995); non-ionic backbones (U.S. Pat. Nos. 5,386,023, 5,637,684, 5,602,240, 5,216,141 and 4,469,863; Kiedrowski et al., *Angew. Chem. Intl. Ed. English* 30:423 (1991); Letsinger et al., *J. Am. Chem. Soc.* 110:4470 (1988); Letsinger et al., *Nucleoside & Nucleotide* 13:1597 (1994); Chapters 2 and 3, *ASC Symposium Series* 580, "Carbohydrate Modifications in Antisense Research", Ed. Y. S. Sanghui and P. Dan Cook; Mesmaeker et al., *Bioorganic & Medicinal Chem. Lett.* 4:395 (1994); Jeffs et al., *J. Biomolecular NMR* 34:17 (1994); *Tetrahedron Lett.* 37:743 (1996)) and non-ribose backbones, including those described in U.S. Pat. Nos. 5,235,033 and 5,034,506, and Chapters 6 and 7, *ASC Symposium Series* 580, "Carbohydrate Modifications in Antisense Research", Ed. Y. S. Sanghui and P. Dan Cook. Nucleic acids containing one or more carbocyclic sugars can also be used in the invention (see Jenkins et al., *Chem. Soc. Rev.* (1995) pp 169-176). A nucleic acid can have any combination of bases including, for example, uracil, adenine, thymine, cytosine, guanine, inosine, xanthanine, hypoxanthanine, isocytosine, isoguanine, or the like. Several other nucleic acid analogs are described in Rawls, *C & E News* Jun. 2, 1997 page 35.

As used herein, the term "protein" is intended to mean a chain of amino acids connected by peptide bonds. The term is intended to be synonymous with the terms "peptide," "oligopeptide" and "polypeptide." The terms are intended to include chains having any possible number of amino acids, unless explicitly indicated otherwise. Accordingly a protein can include a single linear chain having at least about 2, 3, 4, 5, 6, 7, 8, 9, 10, 15, 20, 25, 50, 100, 500 or more amino acids. If desired, a protein useful in the invention can have a maximum length including, for example, at most about 500, 100, 10, 5 or fewer in a linear chain. A protein can include one or more of the 20 amino acids used by a human cell to translate RNA into protein. In particular embodiments, a protein can include or exclude other amino acids such as non-naturally occurring amino acids.

As used herein, the term "quality metric" is intended to mean a representation for one or more characteristics of a molecule. The representation can be, for example, a numerical value such as a score or threshold value, a mathematical function, a computer readable code or symbol, or a qualitative characterization. A quality metric can relate a plurality of parameters from a separation record for a reaction product. Exemplary parameters include those set forth in further detail below. An exemplary quality metric is a 'pass' or 'fail' rating for a desired polymer or polymer synthesis reaction.

As used herein, the term "coupling efficiency" is intended to mean the yield for one or more individual steps of a polymer synthesis reaction. Coupling efficiency can be determined for a polymer as the average of the yields for all steps of the polymer synthesis reaction. An exemplary formula for determining coupling efficiency is:

$$CE = (Y)\hat{0}1/L \quad \text{(Formula I)}$$

wherein CE is coupling efficiency for a polymer reaction, Y is overall yield for the polymer reaction desired product, and L is the total length of the polymer in numbers of repeating units. In particular embodiments, L can be selected from a particular range of polymer lengths including, for example, at least 5, 8, 9, 10, 11, 12, 15, 20 or more repeating units up to and including the peak capacity of the separation method being used. Average CE for one or more steps of a polymer synthesis reaction can also be determined as the sum of yields measured for all steps of the polymer synthesis.

Yield can be determined, for example, from the area of a peak for a desired product divided by the sum of the areas for all integrated peaks in a separation record according to:

$$Y = Pa_1 / \Sigma Pa_n \quad \text{(Formula II)}$$

wherein Pa represents peak area, the subscript 1 is selected for the desired peak and n is the number of integrated peaks in a separation record. Coupling efficiency can be determined for a single step or a portion of the steps for a polymer synthesis reaction as desired.

As used herein, the term "signal-to-noise," when used in reference to a peak in a separation record, is intended to mean the peak intensity relative to the background intensity or variation in the separation record. Intensity can be represented as amplitude, peak area, or other desired metric. In this regard, "noise" is the signal produced by a detector in the absence of reaction product. Typically, signal-to-noise is represented as a ratio. However, other relative values such as percentage can be used. Signal-to-noise can be determined by methods well known in the art of chromatography or spectroscopy. For example, signal-to-noise can be determined according to:

$$S/N = I_b / (\alpha * SD_b) \quad \text{(Formula III)}$$

wherein S/N is signal-to-noise, $I_b$ is baseline adjusted signal intensity, $\alpha$ is the coefficient indicating the number of standard deviations and $SD_b$ is the standard deviation of the noise. The number of standard deviations can be selected as desired for a particular application or desired stringency in data analysis. In this regard, higher $\alpha$ values result in a smaller range for SD and can be selected from $\alpha = 1, 2, 3, 4, 5, 6,$ or higher. Noise can be determined using a high-pass filter as described, for example, in Example I.

As used herein, the term "width-at-fractional height" is intended to mean the width of a peak at a height that is between the peak maximum and the baseline. For example, a width-at-half height refers to the width of a peak at a height that is halfway between the peak maximum and the baseline. A width can be measured in units of time, for example, when a separation record is based on retention time or width can be measured in units of distance, for example, when a separation record is based on distance along a separation path. If desired, width can be unitless or can be determined as a number of datapoints in the separation record. Width can also be measured in units of volume as is typically done in chromatography. Other widths or portions of a separation record, such as width-at-top of a peak, width-at-base of a peak or others set forth herein, can be similarly measured.

As used herein, the term "width-at-top" is intended to mean the width of a peak at its maximum intensity. Typically the width-at-top for a peak will have a length of 1 data point or a few data points along the axis for a separation path. However, a peak that saturates a detector can include many units, thereby giving the peak the appearance of having a plateau.

As used herein, the term "flatness," when used in reference to a separation record, is intended to mean the correlation between peak height, from the base of the peak to the maximum of the peak, and the full range of signal intensities for the separation record. The correlation can be, for example, a ratio of peak height to the range of signal intensities. The correlation can also be a percentage of peak height to range, for example according to $$F = 100 * (Ph / Rg) \quad \text{(Formula IV)}$$

wherein F is flatness, Ph is peak height for a desired peak in a separation record and Rg is the range of signal intensities.

As used herein, the term "resolution," when used in reference to peaks in a separation record, is intended to mean the extent of separation between the peaks in the separation record. Resolution can be determined, for example, using methods known in the art of chromatography or spectroscopy. For example, resolution can be represented as the distance between peaks or the extent of differences between peaks that can be determined. An exemplary equation for determining resolution (Rs) is $$Rs = SQRT(2ln2)*(T_2-T_1)/((Wh_1+Wh_2)/(M_2-M_1)) \quad \text{(Formula V)}$$

wherein SQRT is the square root; ln is the natural logarithm; $T_2$ and $T_1$ are the retentions for a peak expected for a desired polymer and adjacent peak, respectively; $Wh_1$ and $Wh_2$ are the widths at half height for the peak expected for a desired polymer and adjacent peak, respectively; and $M_1$ and $M_2$ are the numbers of monomers expected for the desired polymer and for a polymer in the adjacent peak, respectively.

As used herein, the term "width-at-base" is intended to mean the width of a peak at the baseline. Width-at-base can be measured and can have units as set forth herein in regard to width-at-half height or width-at-top.

As used herein, the term "height," when used in reference to a peak, is intended to mean the length between the maximum of a peak and the base of a peak. The difference can be, for example, a signal intensity or other value for the distance between the peak maximum and base. The height can be calculated for a peak that is baseline adjusted or for a peak that is not baseline adjusted, as desired.

As used herein, the term "retention" is intended to mean the location of a peak in a separation record or the location of a molecule along a separation path. For example, a peak can be identified by retention time in a separation record that represents separation as a function of time or a peak can be identified as a retention distance in a separation record that represents separation as a function of distance. Retention is typically determined based on location of a peak maximum in a separation record. However if desired, retention can be determined based on one or more other properties of a peak such as the location of the mean or median width of the peak at base, half height or top. Retention can also be determined based on the location of its leading edge, trailing edge or both in a separation record.

Description of Particular Embodiments

The invention provides a method of evaluating treatment for a desired polymer species, wherein a separation record for a polymer synthesis reaction product is provided and wherein the separation record includes a baseline and at least one peak corresponding to the desired polymer species. The method can include the automated steps of: (a) evaluating the baseline and optionally adjusting the baseline, thereby providing a baseline evaluated separation record; (b) identifying, in the baseline evaluated separation record, the at least one peak corresponding to the desired polymer species; (c) determining a quality metric for the desired polymer species based on a plurality of parameters of the baseline evaluated separation record, the parameters including signal-to-noise of the at least one peak, and retention of the at least one peak; (d) determining coupling efficiency for the desired polymer species; and (e) selecting at least one treatment from a plurality of alternative treatments for the desired polymer species, wherein the at least one treatment is selected based on the quality metric and the coupling efficiency, wherein the plurality of alternative treatments are correlated with different quality metrics and coupling efficiencies. Various combinations of parameters can be used to determine a quality metric for a desired polymer species including, but not limited to, one or more of those set forth above in step (c) above or one or more of those set forth elsewhere herein. The desired molecule can be, for example, a desired polymer species such as a bioactive polymer species.

A method of the invention can be carried out using a computer algorithm as diagramed, for example, in FIG. 1. Accordingly, a method of the invention can be carried out using the computer implemented steps of (a) inputting a separation record for a synthesis reaction product into the computer; (b) evaluating the baseline of the separation record and optionally adjusting the baseline, thereby providing a stored baseline evaluated separation record in the computer; (c) identifying, in the stored baseline evaluated separation record, at least one peak corresponding to a desired molecule; (d) determining a quality metric for the desired molecule based on a plurality of parameters of the stored baseline evaluated separation record, the parameters including signal-to-noise of the at least one peak and retention of the at least one peak; (e) determining coupling efficiency for the desired molecule; (f) selecting at least one treatment from a plurality of alternative treatments stored in the computer for the desired molecule, wherein the at least one treatment is selected based on the quality metric and the coupling efficiency, wherein the plurality of alternative treatments are correlated with different quality metrics and coupling efficiencies; and (g) outputting instructions for the at least one treatment.

A separation record for a polymer synthesis reaction product will typically include a peak corresponding to a desired full length polymer species. Other peaks in the separation record will correspond to other species in the reaction product, if present. Examples of other polymer species that can be present in a reaction product, and represented by one or more peaks in a separation record, include without limitation, polymer species having fewer than the desired number of monomers; polymer species having more than the desired number of monomers, polymer species having a different sequence of monomers compared to the desired polymer, or polymer species having modifications that result in additional or absent moieties compared to the desired polymer product. Further compounds, that can be present in a reaction product, and represented by one or more peaks in a separation record include, for example, unreacted monomers or other reagents, products of unwanted side reactions between monomers or other reagents, or contaminants derived from reagent sources.

The invention is particularly useful for evaluating a reaction product of a polymer synthesis because typically any undesirable compounds produced from a polymer synthesis are different species of the same type of polymer. For example, these other polymer species can have fewer than the desired number of repeating units. For many separation methods, the location of peaks for different polymer species can be relatively well resolved from each other such that the peak for a full length polymer species can be distinguished. Those skilled in the art will know or be able to determine appropriate separation conditions to obtain an optimal or otherwise useful level of resolution suitable for the size range of the polymer species being separated. The invention is further well suited to polymer synthetic reactions because, in many cases, peak locations for polymer species of different length can be predicted based on factors such as the composition of the polymer species, separation conditions or both. Thus, in some embodiments, a more complete evaluation of a polymer reaction product can be achieved using the invention compared to the evaluation possible for products of other synthetic reactions, such as non-polymer synthetic reactions. However, several embodiments of the invention do not require evaluation at this level and, therefore, the invention can be used for reaction products of non-polymer synthetic reactions.

Any of a variety of separation methods known in the art can be used to generate a separation record useful in the invention. Typically, separation is based on a physical property of an analyte such as mass, charge, charge-to-mass ratio, affinity for receptor or ligand, hydrophobicity, frictional coefficient, size, magnetic moment or a combination thereof. Separation can be based on one or more other properties known in the art. Exemplary separation methods include, but are not limited to, a chromatographic separation such as size exclusion chromatography, ionic chromatography, silica gel (straight phase) chromatography, reverse phase chromatography, affinity chromatography, gas chromatography or the like; electrophoretic separation such as capillary electrophoresis or slab gel electrophoresis such as polyacrylamide gel electrophoresis or agarose gel electrophoresis; mass spectrometry such as matrix assisted laser desorption and ionoization time of flight mass spectrometry (MALDI TOF MS), electrospray ionization mass spectrometry (ESI MS), surface enhance laser desorption and ionization mass spectrometry (SELDI MS), or chemically modified analyte gas chromatography mass spectrometry (CMA GC MS) where the MS can either be TOF or quadrapole; or combinations of the above separation methods such as gas chromatography-mass spectrometry. Thus, a separation record can be a function of a separation path measured in time or distance. For example, in the case of a chromatographic method, separation can be recorded as a function of retention time of an analyte in the chromatographic media. As in some types of mass spectrum separation records, separation can be a function of distance that an analyte travels in an electromagnetic field. Separation records of slab-electrophoresis gels are typically also a function of distance as derived, for example, from an image of a slab gel in which the "peaks" are bands at a particular location in the gel that produce a signal, such as an optical signal from a stain or decay count from a radioactive isotope.

A separation record useful in the invention can include any of a variety of signals known in the art. For example, in a case where the separation record is a chromatograph the signal can be an optical signal such as a fluorescence, absorbance, refractive index or light scatter signal. Those skilled in the art will recognize that detection methods other than optical detection can be used for analytes separated on a chromatographic medium, such that a chromatograph can include any of a variety of non-optical signals. Other signals that can be included in a separation record, such as a chromatograph, include those derived from, for example, mass, electrical conductivity, size, energy absorbance, luminescence, charge, or affinity for particular substrates.

The type of signal that constitutes a peak in a separation record will depend upon the detector used to monitor the separation. Useful detectors include a detector that produces a signal that is proportional to the rate of mass flow such as a flame ionization detector, a detector that produces a signal that is proportional to the concentration of an analyte such as a fluorescence or light absorbance detector; a detector that measures a bulk property such as a refractive index detector or conductometric detector; a selective detector that measures a subset of analytes in a reaction product such as an absorbance detector tuned to a single wavelength or a general detector that measures a large class of analytes such as an absorbance spectrometer that is tuned to a wide range of wavelengths spanning, for example, the ultraviolet and/or visible regions of the spectrum; a destructive detector that consumes analytes such as a flame ionization detector or flame photometric detector; a non-destructive detector such as an absorbance or fluorescence detector; an analog detector that produces a continuous signal output or a digital detector that produces a digitized signal output.

A method of the invention can include a step of separating a reaction product such as a polymer synthesis reaction product using a separation method such as those set forth above, or otherwise known in the art. Alternatively or additionally, a separation record can be obtained previously, for example, from a different location. Thus, a separation record can be obtained from a storage location such as a computer readable medium.

Exemplary forms of computer readable media include, but are not limited to, a database, hard disk, floppy disc, compact disc, magneto-optical disc, Random Access Memory, Read Only Memory or Flash Memory. The memory or computer readable medium used in the invention can be contained within a single computer or distributed in a network. A network can be any of a number of systems known in the art such as a local area network (LAN) or a wide area network (WAN). Other types of memories and computer readable media are also contemplated to function within the scope of the invention.

Data stored at a storage location can be in an y of a variety of forms known in the art including, for example, a binary file, compressed file, encrypted file, text file, xml file, xls file, csv file, jpg file, TIFF file, or BMP file. Software to implement a method of the invention can be written in any well-known computer language, such as Standard Generalized Markup Language (SGML), Hypertext markup language (HTML) Extensible Markup language (XML), Java, C. C++, C#, Visual Basic, FORTRAN, MATLAB, R or COBOL and compiled using any well-known compatible compiler.

A computer system useful in the invention can further include a laboratory information management system (LIMS). A LIMS can contain information relating to the identification of a reaction product, manipulations that the reaction product has undergone in a laboratory setting, manipulations that the reaction product will undergo in a laboratory setting, protocols for handling a reaction product in a laboratory setting, parameters for a reaction product and/or a quality metric for a reaction product. An exemplary LIMS and information that can be stored therein are described in further detail in Example II below.

A reaction product for which a separation record is produced can be generated using any of a variety of synthetic methods known in the art. By way of example, a nucleic acid synthetic reaction can be carried out using methods known in the art including, for example, those described in US Pat. App. Pub. No. 2004/0219063 A1; U.S. Pat. Nos. 5,338,831, 6,121,054, 6,663,832 and 6,846,460; and WO 00/44491. A protein synthetic reaction can be performed as described, for example, in US Pat. App. Pub. No. 2004/0219063 A1, U.S. Pat. Nos. 5,202,418, 5,338,831, 6,121,054, 6,663,832 and 6,846,460. Other methods for synthesizing polymers include, for example, those described in Sandler et al., *Polymer Synthesis Characterization: A Laboratory Manual* Academic Press, San Diego, Calif. (1998); Stevens, *Polymer Chemistry: An Introduction*, Oxford University Press, Oxford, England (1999) or Ebdon, *New Methods of Polymer Synthesis*, Blackie Academic and Professional, London, England (1991).

Synthetic methods can be performed concurrently with or prior to performing a separation method. Thus, a method of the invention can include a step of performing a synthetic reaction. Alternatively or additionally, a synthetic reaction product can be obtained from a storage location or from a remote location. Thus, a synthetic reaction product can be produced at a different location from the location where separation is performed or the location where evaluation of a separation record is performed.

A separation record can be input into a method or computer using a manual or automated method. For example, a manual method can include a step in which a human user inputs or transfers a separation record using commands provided via a graphical user interface. Alternatively, an algorithm can include commands to search a computer memory, such as a database, for a separation record related to a desired polymer product in an automated fashion. A separation record can also be sent to an algorithm according to automated commands, for example, triggered by completion of a separation method. Thus, a separation record can be input without human intervention.

A method of the invention can include a step of evaluating the baseline of a separation record and, optionally, adjusting the baseline, thereby providing a baseline evaluated separation record. A baseline can be evaluated to determine the extent to which it has desired properties such as pitch (i.e. amount of drift), continuity (i.e. number or magnitude of breaks in the detected signal) or noise (i.e. background signal intensity). A baseline can be adjusted by applying a function to a separation record to produce a baseline adjusted separation record having different (typically, more desirable) properties than the original separation record. For example, a template baseline can be fitted to all or part of the baseline of a separation record and then the template baseline can be subtracted from the separation record to produce the baseline evaluated separation record.

In particular embodiments, the template baseline used for adjustment is a quadratic baseline. A quadratic baseline can be produced by fitting at least a portion of a separation record, for example, using $$B = A0\_B + (A1\_B^* t) + (A2\_B^* t^2) \quad \text{(Formula VI)}$$

wherein B is baseline, t is retention time (or other appropriate dimension for the separation path) and A0, A1 and A2 are multipliers for the quadratic equation. Adjustment can then be made by subtracting the template baseline from the signal trace to correct the separation record for the background drift. A quadratic baseline can be fit using a robust fit method. Useful robust fit methods are those that are resilient to the effects of noise and outliers such as a median fit. Multipliers or other information that describes baseline adjustment or fit can be used as parameters in determining a quality metric as set forth below. As set forth below, a system or method of the invention can produce one or more instructions based on the baseline parameters such as instructions regarding how to treat a particular synthesis product.

Other template baselines useful for adjusting a separation record include, for example, a rubber band baseline or straight-line baseline. A rubber band template baseline can be fit by drawing a curve through various low points in a separation record. Low points can nominally be the positions in a separation record that correspond to signal intensities associated with locations between subcomponents of the reaction product mixture being separated. Alternatively, a straight-line template baseline can be fit by drawing a line through at least two points in a separation record. Either can be fit to at least a portion of a separation record and then subtracted from the separation record to produce a baseline evaluated separation record. For example, a template baseline can be fitted to one or more portions of a separation record that are considered as being relatively quiet for substantially lacking noise or peaks.

The template can then be applied to all or part of the separation record, for example, by subtraction and/or other desired function.

A method of the invention can include a step of identifying at least one peak in a separation record corresponding to a desired analyte such as a polymer species. A peak can be identified in a separation record with or without prior manipulation such as baseline correction. Peak funding can be carried out for all of a separation record or for a portion of a separation record. In the latter case peak funding can be carried out, for example, in the portion of the separation record where a peak for a desired molecule is expected to occur. An exemplary method for determining a portion of a separation record where a peak for a desired molecule is expected to occur and performing peak funding in that portion is described in Example II.

In particular embodiments, one or more peaks in a separation record can be identified by performing a wavelet transform of the separation record, or a portion thereof. Wavelet multi-resolution analysis mimics the mammalian retina and visual cortex in being sensitive to spots and edges, at a variety of scales and translations. Currently, a large library of wavelets is available including, for example, those described in Mallat, *A Wavelet Tour of Signal Processing*, Academic Press, San Diego Calif. (1998) or *MATLAB Wavelet Toolbox User's Guide*, Math Works, Inc. Natick, Mass. (2004). Exemplary wavelet families in the library and useful in the invention include, without limitation, Haar, Daubechies, Coiflets, Biorthogonal, Symlets, Meyer, and Morlet wavelets. Due to their linear phase, Biorthogonal wavelets are particularly useful in image and signal processing. The members of the Biorthogonal family include: 1.1, 1.3, 1.5, 2.2, 2.4, 2.6, 2.8, 3.1, 3.3, 3.5, 3.7, 3.9, 4.4, 5.5, and 6.8, where the first digit identifies the order of the reconstruction wavelet function, and the second digit indicates the order of the decomposition wavelet function. As set forth in Example I, Biorthogonal 2.8 is particularly useful for evaluating electropherograms of oligonucleotide synthesis products, due to its phase linearity and its high similarity to the general shape of the peaks for desired oligonucleotide species.

Typically, a wavelet transform is carried out by first decomposing a signal into 'detail' and 'approximate' coefficients, at different scales. This causes the main signal to separate from the undesired signals (examples of undesired signals include an injection peak that occurs due to sample loading and noise peaks). Then the undesired signals are suppressed (or completely removed) and the main signal is reconstructed. The reconstructed signal will include a more prominent peak for the desired signal. This action is also useful for reducing or removing the adverse effects of shoulders and merged peaks that would otherwise complicate identification of a desired peak.

Other methods of identifying peaks can also be used in the invention. For example, searching for peaks based on maximum signal amplitude or signal area can be used in cases where the desired peaks dominate a separation record and are well resolved from other peaks. Peaks can also be identified based on other parameters such as shape, location in a separation record or proximity to another peak such as an internal or external standard. Further peak identification methods that can be used in the invention are described, for example, in U.S. Pat. No. 6,019,896.

If desired, peak funding methods of the invention can be used to identify peaks for particular subsets of analytes. For example, a particular peak funding method can be used for polymers having at least 5, 10, 25, 50, 75, 100 or more repeating units. Similarly, a particular method can be used for polymers having at most about 100, 75, 50, 25, 10 or 5 or fewer repeating units. Moreover, a particular peak funding method can be used for polymers having a length in a range between any of the above values.

A method of the invention can include a step of determining a quality metric for a reaction product. It will be understood that a quality metric for a reaction product can be applied to the reaction product as a whole or to a particular component of the reaction product such as a desired polymer species in the reaction product. Similarly, a quality metric for a reaction product can be applied to the particular reaction used to produce the reaction product.

A quality metric can be represented in a form that is convenient or otherwise desired for a particular application of the invention. For example, a binary score can be assigned to one or more parameters derived from a separation record for a reaction product in order to objectively indicate 'pass' or 'fail' status for a synthetic reaction product or separation record. A binary score of 1 for pass and 0 for fail is convenient because mathematical functions can be used to combine multiple scores for a meaningful quality metric. Exemplary use of binary scores to indicate pass or fail for various parameters and multiplication of the binary scores to arrive at a final quality metric is set forth in Example II. It is also possible to represent a quality metric using a score having more than two options including, for example, a ternary score. An exemplary ternary score useful in the invention is described in Example II where a quality metric of −1, 0 or 1 is assigned to a reaction product in correspondence with the scores for different parameters that are combined to arrive at the quality metric. Thus, the quality metric can provide information beyond a mere pass or fail. The further information can indicate, for example, the type of failure or proposed actions in response to failure such as 'review,' 'repeat' or other action. Alternatively or additionally, a quality metric can be represented as a discreet score within a range of possible scores such as a fraction between 0 and 1 or a percentage.

A quality metric can be communicated and/or recorded in a format that is readily understood by a human such as an alphanumerical symbol, set of symbols or an image. For example, an alphanumeric or image based score can be output to a graphical user interface for convenient communication to a human user. If desired for a particular embodiment, the format for a quality metric can be computer or machine readable. In this case, the quality metric can be directly recognizable by a human user such as one or more commands written in computer code or the quality metric can be in a format that is not readily or directly understood by a human user such as one or more electronic or mechanical signals. Similar formats can be used for other scores, parameters or instructions referred to herein.

A quality metric can be determined for a particular reaction product based on one or more parameters of a separation record. The separation record can be, but need not be baseline adjusted prior to determining one or more of the parameters. Exemplary parameters that are useful for determining a quality metric for a separation record include, but are not limited to, signal-to-noise for at least one peak, width-at-top for at least one peak, flatness of the separation record, baseline properties, number of peaks above a particular amplitude, width-at-base of at least one peak, retention of at least one peak, width-at-fractional height of at least one peak, resolution between two or more adjacent peaks, fractional area of at least one peak compared to total separation record area (i.e. fractional yield), coupling efficiency (for example, in embodiments directed to polymer synthesis) or height of at least one peak. Such parameters can be used to determine a quality metric for a reaction product based on its separation characteristics. The quality of a reaction product can also be determined based on coupling efficiency, yield or other quantitative measures for the reaction. Exemplary combinations of parameters that are useful in the invention are set forth below and in the Examples. The invention is not limited to these exemplary combinations and other combinations will be apparent to those skilled in the art based on the teachings herein and the desired application of the invention.

It will be further understood, that a parameter, quality metric or other characteristic determined for a separation record in accordance with the examples set forth herein is also applicable to the separation method. For example, a passing score for a separation record will reflect a passing score for the separation that was recorded.

Thus, the invention provides a method of evaluating a separation method for a polymer synthesis reaction product, wherein a separation record for the polymer synthesis reaction product is provided and wherein the separation record includes a baseline and at least one peak corresponding to a desired polymer species. The method can include the automated steps of: (a) evaluating the baseline and optionally adjusting the baseline, thereby providing a baseline evaluated separation record; (b) identifying, in the baseline evaluated separation record, the at least one peak corresponding to the desired polymer species; (c) determining a quality metric for the separation record based on a plurality of parameters of the baseline evaluated separation record, the parameters including signal-to-noise of the at least one peak, and retention of the at least one peak; and (d) selecting at least one separation treatment from a plurality of alternative separation treatments for said polymer synthesis reaction product, wherein said at least one treatment is selected based on said quality metric for said separation record, wherein said plurality of alternative treatments are correlated with different quality metrics. Various combinations of parameters can be used to determine a quality metric for a separation record including, but not limited to, one or more of those set forth above in step (c) above or one or more of those set forth elsewhere herein. Furthermore, the method can be used for products of reactions other than polymer synthesis reactions.

Signal-to-noise (S/N) can be determined using a method that compares signal level to background level for at least one peak of a separation record. For example, Formula III can be used as set forth above. The standard deviation used in Formula III can be obtained for a filtered separation record. For example, a separation record can be processed by a high pass filter such as an elliptical filter or a Butterworth filter and then the standard deviation obtained for the filtered record. An exemplary method for using the standard deviation from a filtered separation record is described in Example II below. Other methods known in the art for obtaining S/N can also be used including, for example, the use of high and low pass filter algorithms, ranking peaks according to amplitude and determining a cutoff point under which peaks are considered noise as described in U.S. Pat. No. 6,019,896.

S/N is typically represented by a number indicating a measured ratio. The ratio can be compared to a predefined threshold and values at or above the threshold can be given a score indicative of a passing separation record, whereas those below the threshold will be given a score indicative of a failed separation record. The ratio value, pass/fail score or both can be used to determine a quality metric for a separation record or otherwise determine how to treat the separation method or reaction product analyzed in the separation method. As described in Example II, the pass/fail score can be combined with other parameters in determining the quality metric for a particular separation record or reaction product.

It will be understood that a plurality of parameters for a separation record can be important in determining quality of a reaction product. For example, evaluation of a plurality of parameters related to a separation record can be useful for determining whether a false negative will result in a fail score for a reaction product that is actually good quality or whether a false positive will result for a poor quality reaction product. Taking S/N as a more specific example, there can be a correlation between S/N and reaction product quality where S/N is low due to low yield of the desired product. This, however, is typically determined in view of an injection parameter related to factors that affect the amount of product that is injected such as the amount of salt in the injected solution. Accordingly, the S/N parameter can be evaluated in combination with at least one other parameter in determining quality metric for a desired product even in cases where only one of the parameters is used to determine the quality of the separation record itself. Those skilled in the art will be able to determine appropriate combinations of parameters and/or quality metrics based on the teaching herein and the particular application of the invention as it relates to factors such as the analyte being evaluated, the synthetic method used and the separation method used.

A plurality of separation record parameters can be used to determine whether or not a separation record is appropriate for use in determining quality metrics for a reaction product. Thus, if a separation record is given one or more failing scores for separation parameters then instructions can be sent to automatically fail the reaction product or to defer quality metric determination for the reaction product until a new separation record is produced for the reaction product.

In addition to providing information about the quality of a reaction product, signal-to-noise can be useful for evaluating whether or not the correct amount of material has been loaded into a separation device and whether or not the instrument is delivering reliable data. Thus, if the S/N value is below a predetermined threshold then instructions can be produced to repeat the separation or to troubleshoot the separation process. The instructions can further indicate changes in the separation methods either as a suggestion or direct instruction. Similarly, instructions regarding the types of troubleshooting to carry out can be given. Such instructions can be formulated based on comparison of the S/N parameter to other S/N parameters, wherein the other S/N parameters are associated with a known type of failure and known correction. The instructions can be formulated further in view of other parameters and comparison of these parameters to other parameters that are indicative of known failures and solutions. In the case of an automated system, instructions for the repetition or troubleshooting can be communicated to an appropriate device. In a manual or semi-automated embodiment, appropriate instructions can be communicated to a human user, for example, via a graphical user interface, and the human user can implement the instructions. Instructions similar to those exemplified above as a response to a S/N parameter can be produced in response to one or more other parameters described herein.

The width of a peak at various locations can be measured and these parameters used to determine a quality metric for the corresponding separation record or reaction product. For example, the parameters of width-at-top, width-at-base, or width-at-half height can be measured as set forth in Example II. As further described in Example II, the width measurements can be compared to respective threshold values, a pass/fail score determined for each width parameter, and one or more of the width parameters used to determine a quality metric. Those skilled in the art will recognize that a width parameter can be obtained at other fractional heights as desired such as quarter height, third height and so forth. Furthermore, width parameters can be used to evaluate the quality of a separation record independent of other parameters and furthermore to determine a treatment for a reaction product, if desired.

Width parameters can be combined with each other and/or with peak height to obtain a more detailed determination of peak shape. The width parameters can be compared to a range of parameters for a template peak having a desired or otherwise expected shape for a particular separation (for example, goodness of fit can be determined between a detected peak and a template peak). Differences in the detected peak shape from the template peak can be evaluated to identify not only that the detected peak has aberrant shape, but also to determine potential causes for the undesirable shape. For example, a peak that has a wider than expected width-at-half height can be identified as being a composite of two or more peaks. In a further example, a peak having a width-at-base that is larger than expected can be identified as having a tail due to overloading of the capillary or undesirable surface characteristics of the capillary.

Once a failed reaction product or separation record is identified based on a width parameter of a peak in a separation record, a system or method of the invention can output instructions to further evaluate the separation process. For example, if the failure in width-at-top is indicative of detector saturation then instructions can be given to repeat the separation using a lower gain setting for the detector or using less reaction product loaded into the separation device. In cases where the width parameter indicates presence of multiple product species in a peak (for example, a peak with a shoulder or a composite peak), instructions can be output to repeat the separation using different conditions that separate the species into separate and distinguishable peaks. Alternatively, instructions can be output to re-synthesize the desired product. Generally, a system or method of the invention can produce an output with a specific instruction or set of instructions based on a width parameter as set forth in further detail below.

Figure 2:
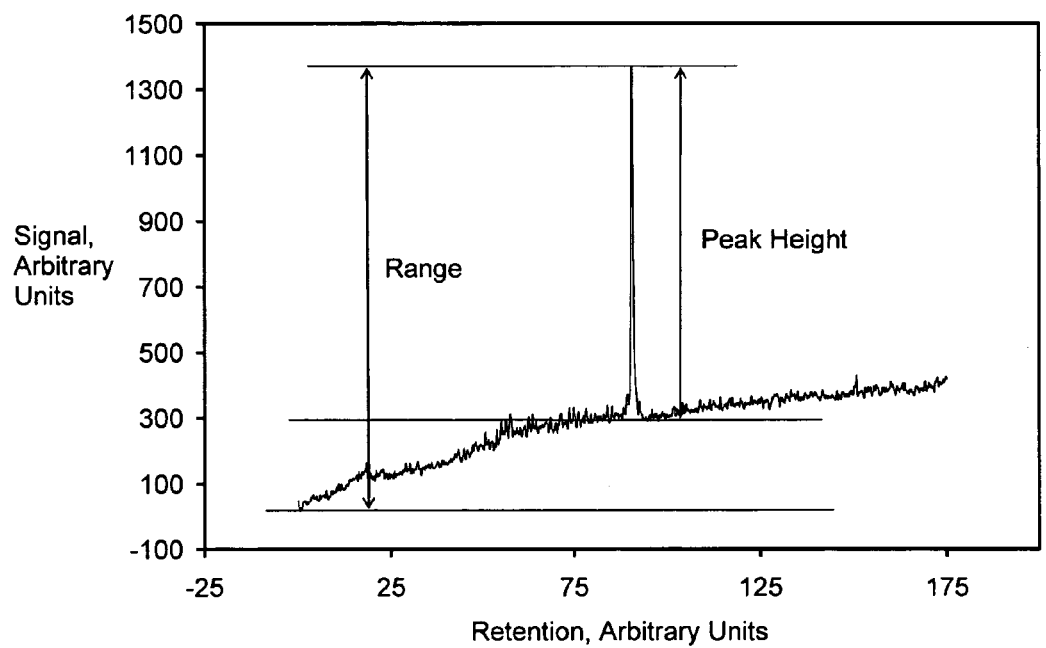
FIG. 2 shows an electropherogram and variables useful for determining flatness.

Flatness for a separation record can be determined using Formula IV as set forth herein previously. For purposes of illustration, FIG. 2 is provided showing an electropherogram having substantial baseline drift. The peak height is indicated by the arrow labeled "Peak Height" and is the distance between the maximum peak intensity and the minimum peak intensity on the Y-axis. The range is determined as the distance between the lowest signal intensity for the entire trace and highest signal intensity for the entire trace as indicated in FIG. 2 as the difference in signal intensities on the Y-axis corresponding to the arrow labeled "Range."

A ratio value of 1 for flatness is ideal as it indicates that the range of the electropherogram is equivalent to the peak height. A pass or fail score can be determined for a separation record or synthesis product based on whether the ratio value is at, above or below a threshold value. The flatness ratio value, flatness pass/fail score or both can be determined and used to further determine a quality metric, for example, as set forth in Example II. A flatness parameter can provide information about the temperature stability of a capillary electrophoresis device used to generate the separation record under analysis. In this regard, joule heating in the capillaries due to high current can cause baseline drift. A system or method of the invention can produce an output with a specific instruction or set of instructions based on the flatness parameter such as instructions resulting in reduced capillary heating or other instructions such as those set forth in further detail below.

A method of the invention can include a step of determining the number of peaks in a separation record that are at or above a particular amplitude (N-fractional height). The amplitude can be any fraction of the height of a particular peak in a separation record including, for example, the half height as described in Example II, or other fractional heights such as quarter height, third height, three quarters height or two thirds height. The N-fractional height value can be compared to a threshold value and an N-fractional height pass/fail score assigned based on whether the count value is at, below or above the threshold. Accordingly, a separation record having few or nor spurious peaks will pass, whereas a separation record having an unacceptable number of spurious peaks will be failed. As described in Example II, the N-fractional height pass/fail score can be used as a parameter to determine a quality metric for a particular reaction product or separation record. If desired, the N-fractional height pass/fail score, N-fractional height count value or both can be used as an N-fractional height parameter to determine a quality metric or otherwise determine how to treat a particular reaction product. A system or method of the invention can produce an output with a specific instruction or set of instructions based on a particular N-fractional height parameter as set forth in further detail below.

A method of the invention can include a step of determining retention for at least one peak in a separation record. The retention of at least one peak can be used as a parameter for determining a quality metric of a reaction product or separation record, or for determining how to treat the reaction product or separation record. The retention parameter can be the actual retention time or distance for the peak as identified, for example, using the peak funding methods described elsewhere herein. Alternatively or additionally, a retention pass/fail score can be assigned to a reaction product based on whether or not the desired product peak occurs within an expected retention range. An exemplary method for determining the expected retention range for a polymeric species is described in Example II. A system or method of the invention can produce an output with a specific instruction or set of instructions based on a particular retention parameter as set forth in further detail below.

The resolution between two or more adjacent peaks can be determined for a separation record. Resolution can be determined using, for example, Formula V, as set forth above, or using other methods known in the art. A calculated resolution value can be used as a parameter for determining a quality metric for a particular synthesis reaction product, for a separation record or for determining how to treat the synthesis reaction product or separation method. Alternatively or additionally, a resolution pass/fail score can be assigned to a reaction product based on whether or not the resolution value is at or above a desired threshold. A resolution pass/fail score can be used alone or in combination with a calculated resolution value as a parameter for determining a quality metric for a particular synthesis reaction product, for a separation record or for determining how to treat the synthesis reaction product or separation method. A system or method of the invention can produce an output with a specific instruction or set of instructions based on a particular resolution parameter as set forth in further detail below.

A method of the invention can include a step of determining the yield for a desired reaction product. In embodiments of the invention directed to polymer synthesis reactions, the yield of one or more species of polymer can be determined. For example, determination of the yield of a desired species of polymer in a polymer synthesis reaction product is particularly useful for determining quality of the reaction product or for determining options for treating the reaction product. Any of a variety of methods known in the art for determining the amount of a particular species in a reaction product can be used in a method of the invention. An exemplary method is to apply Formula II to a separation record as set forth above. Application of Formula II to determine yield for an oligonucleotide reaction product is provided in Example II.

Those skilled in the art will recognize that Formula II is well suited to determining yield for the product of a polymer reaction based on optical detection because each polymer species in the reaction product will have a similar extinction coefficient. Those skilled in the art will know or be able to determine modifications to Formula II to account for different detection methods or product species. For example, in embodiments where optical detection is used to generate a separation record and product species have different extinction coefficients, the amount of each product species can be determined based on the area under each peak and the extinction coefficient for the product at the particular wavelength used.

A method of the invention can include a step of determining the coupling efficiency (CE) for a polymer synthesis reaction. The CE for a polymer synthesis reaction can be determined using any of a variety of methods known in the art for determining the per step yield or average step yield for adding monomeric units to the growing polymer chain. Formula I is particularly useful for determining CE of a polymer reaction product. Exemplary methods for determining CE for an oligonucleotide reaction product using Formula I are provided in further detail below in Example II. It will be understood that any of a variety of other quantitative parameters for a polymer synthesis reaction can be used in place of CE in a method or algorithm of the invention including, for example, yield, concentration or amount of desired polymer in a reaction product or fraction thereof.

The values for Yield, CE or both can be used, individually or in combination, as a parameter for determining a quality metric for a particular synthesis reaction product or for otherwise determining how to treat the synthesis reaction product. As with the other parameters described herein, a pass/fail score can be assigned to a reaction product based on whether or not the yield value, CE value or both is/are above a desired threshold. A pass/fail score can be used alone or in combination with the calculated value(s) as a parameter for determining a quality metric for a particular synthesis reaction product, for example, as described in Example II. Alternatively, a CE parameter, yield parameter, or both can be used to determine how to treat the synthesis reaction product. A system or method of the invention can produce an output with a specific instruction or set of instructions based on a particular CE parameter, yield parameter, or both as set forth in further detail below.

For purposes of illustration, several pass/fail parameters are described herein with respect to comparison of an empirically determined value to a particular threshold value or to a desired range of values. It will be understood that threshold values useful in the invention can vary substantially from those exemplified herein, for example, to suit particular synthetic reaction products, particular synthetic conditions and other factors. For example, a pass score can be assigned to a CE value (average or per step) that is greater than or equal to about 0.1, 0.5, 0.8, 0.9, 0.91, 0.92, 0.93, 0.94, 0.95, 0.96, 0.97, 0.98, 0.99, or higher. Similarly a pass score can be assigned to a yield value that is greater than or equal to about 0.1, 0.5, 0.8, 0.9, 0.91, 0.92, 0.93, 0.94, 0.95, 0.96, 0.97, 0.98, 0.99, or higher.

A system or method of the invention can store one or more parameters in a storage location such as one or more of those set forth above in regard to storage of a separation record. For example, one or more parameters can be stored in a laboratory information management (LIMS) database as described in Example II.

A method of the invention can produce an output with a specific instruction or set of instructions based on a particular parameter or set of parameters. The instruction or set of instructions can be provided in a format that is recognizable by a human, machine or both such as those set forth above in regard to a quality metric. Thus, instruction or set of instructions can be directed to a human user, for example, in a semi-automated method. In cases where an automated system is used, one or more instructions can be directed to one or more devices that carry out one or more desired treatment for the reaction product.

In cases where an unacceptable parameter is observed, appropriate instructions can be provided to the human user or device(s) such as instructions to repeat the separation or the synthetic reaction or instructions to troubleshoot the separation or synthetic process. The instructions can further direct a user or device to batch one or more reactions for re-synthesis during a particular run or set of runs for a synthetic device. In further embodiments, variations in a particular parameter, compared to an expected or desired parameter, can be automatically determined and appropriate instructions provided. Such a comparison can be carried out, for example, by reference to a look-up table. Depending upon the nature of the parameter and differences from a desired parameter, the instructions can indicate actual or proposed steps to improve the parameter.

A method of the invention can include a step of selecting at least one treatment for a desired species of a reaction product. The treatment can be selected based on a quality metric determined for the desired species or, in the case where the desired species is a polymer, the treatment can additionally or alternatively be selected based on the coupling efficiency for synthesis of the polymer. In semi-automated embodiments of the invention, a particular treatment can be selected by a human user following review of a quality metric and/or coupling efficiency output by a system set forth herein. The invention is particularly advantageous because a particular treatment for a reaction product can be evaluated and/or selected in an automated fashion. Thus, a human user need not intervene between a step of determining a quality metric or other parameter for a reaction product and a step of selecting a treatment for the reaction product.

A particular treatment for a reaction product can be determined from a plurality of alternative treatments. The plurality of alternative treatments can include various predefined treatments that are associated with a parameter or quality metric that is in a predefined range, above a predefined threshold or below a predefined threshold. For example, treatment with a modification reagent can be selected for a reaction product that has a yield and/or quality metric above a particular threshold, whereas if the reaction product has a quality metric and/or yield below the threshold it is not treated with the modification reagent. In cases where the reaction product has a failing score the selected treatment can be to discard the failed product, to further analyze or troubleshoot the synthetic method used to produce the product, or to troubleshoot the analytical method used to produce the separation record upon which analysis was based. Examples of treatments for the reaction product or a desired species of the reaction product include, but are not limited to reaction with a modifying agent, disposal, purification to remove one or more contaminant, lyophilization, transfer to a storage vessel, labeling of the storage vessel, or shipping to a customer or other user of the synthetic product. In addition, a treatment for a failed product can include re-synthesis of the product. In order to accommodate re-synthesis of the failed product using an instrument that is fulfilling a queue of orders for synthesis of other desired products the order can be re-batched to accommodate synthesis of the failed product along with the other desired products that are in the queue.

Accordingly, a method of the invention can include a step of providing instructions to perform one or more treatment. The instructions can be sent to a human user, for example, by an output to a graphical user interface or other forms of computer-to-human communication known in the art. For automated embodiments, the instructions can be additionally or alternatively sent to a device configured to carry out the selected treatment. For example, as set forth in Example II below, instructions can be sent via a laboratory information management system to any of a variety of robots or other instruments in order to implement the instructions.

In a further embodiment, instructions can be sent to fail a synthesis plate having greater than an acceptable number of failed wells. A synthesis plate can also be failed, or an appropriate error message generated, in response to a pattern of well failures. For example, a large number of failures at a particular row, column or section of a plate can trigger failure of the plate or trigger instructions to troubleshoot the synthesis or separation device for errors that may have caused such an error. If a plate has fewer failures then the selected treatment can be to have the plate shipped to a customer or end user. Appropriate instructions can then be sent to downstream devices or human users.

For purposes of illustration, several of the embodiments of the invention have been exemplified for a single synthesis reaction. However, the methods are well suited to applications including a plurality of syntheses that produce several reaction products. The invention is robust being capable of handling different reaction products from different reactions. For example, as set forth in Example II below, the invention can be used to evaluate the products of separate syntheses performed for different species of oligonucleotides contained in a 96 well microtiter plate.

Accordingly, the invention provides a method of evaluating treatment for a plurality of desired polymer species, wherein a plurality of separation records for polymer synthesis reaction products are provided and wherein each of the separation records includes a baseline and at least one peak corresponding to the desired polymer species. The method can include the automated steps of (a) evaluating each of the baselines and optionally adjusting the baselines, thereby providing a plurality of baseline evaluated separation records; (b) identifying, in each of the baseline evaluated separation records, the at least one peak corresponding to the desired polymer species; (c) determining a quality metric for each of the desired polymer species based on a plurality of parameters of each of the baseline evaluated separation records, the parameters including signal-to-noise of the at least one peak, width-at-top of the at least one peak, flatness of the separation record, width-at-base of the at least one peak, and retention of the at least one peak; (d) determining coupling efficiency for each of the desired polymer species; and (e) selecting at least one treatment from a plurality of alternative treatments for each of the desired polymer species, wherein the at least one treatment is selected based on the quality metric and the coupling efficiency, wherein the plurality of alternative treatments are correlated with different quality metrics and coupling efficiencies.

A method or system of the invention can be used to evaluate treatment for a plurality of polymers or other reaction products including any number up to and including the capacity of a synthesis system. For example, synthesis is often carried out in standard microtiter plate formats that include, but are not limited to, at least 8, 16, 96, 384, or 1536 or more reactions per plate. Furthermore, several plates can be evaluated using the invention. The invention allows a separation record to be evaluated and a quality metric to be determined in a fraction of a second using readily available computer hardware. An advantage of the invention is that a plurality of separation records can be accurately evaluated in an automated or semi-automated fashion at a rate that surpasses other methods. In this regard, a method of the invention can be used to determine a quality metric for at least about 60, 96, 120, 288, 360 or more separation records per minute. Thus, depending upon the rate at which separation records can be acquired, the invention can be used to determine quality metrics for at least about 100, $1 \times 10^3$, $1 \times 10^5$, $1 \times 10^7$, $1 \times 10^9$ or more separation records in a day and, if desired, at least one treatment can be selected for each of at least about 100, $1 \times 10^3$, $1 \times 10^5$, $1 \times 10^7$, $1 \times 10^9$ or more polymer species per day. The invention is particularly advantageous over manual methods, not only because of the higher throughput provided, but also because the automated methods avoid biases and loss of objectivity that can develop for a human user when working with a large volume of data.

A further advantage of the invention is that accurate determination of appropriate treatments can be determined for a plurality of reaction products. For example, in embodiments wherein separation records are evaluated at the rates exemplified above, an appropriate treatment can be selected for a majority of the reaction products evaluated. Those skilled in the art will recognize that the accuracy of determining appropriate treatment for reaction products can be increased by increasing the number of parameters used to determine a quality metric for the reaction product. Furthermore, additional parameters to those exemplified herein can be used to determine a quality metric for a particular reaction product. Those skilled in the art will further recognize that as the number of parameters increases the computational time can also increase and may, therefore, reduce the rate at which separation records are evaluated. However, it will be understood that different combinations of parameters, computer hardware, software or the like can be used such that evaluation of treatments for a plurality of separation records occurs at an acceptable pace.

The invention provides a system capable of carrying out one or more of the steps set forth herein. The system can include one or more computers such as one or more personal computer or one or more LIMS. A system of the invention can further include commands for producing the instructions set forth herein and for performing other tasks related to making and using the invention. The commands can be provided in any of a variety of formats known in the art including, for example, computer languages set forth herein. Software useful for the invention normally runs from instructions stored in a memory on a host computer system. Exemplary computer languages and computer systems useful in this regard include those set forth elsewhere herein.

Thus, the invention provides an automated laboratory information management system. The system can include at least one signal detector configured to detect a polymer synthesis reaction product, at least one computer processing unit and at least one instrument configured to treat a desired polymer species, wherein the at least one signal detector is configured to communicate a separation record for the reaction product to the at least one computer processing unit, wherein the at least one computer processing unit is configured to control a function of the at least one instrument, and wherein the at least one computer processing unit includes commands for (a) obtaining the separation record from the at least one signal detector; (b) evaluating the baseline for the separation record and optionally adjusting the baseline, thereby providing a baseline evaluated separation record; (c) identifying at least one peak of the baseline evaluated separation record corresponding to the desired polymer species; (d) determining a quality metric for the desired polymer species based on a plurality of parameters of the baseline evaluated separation record, the parameters including signal-to-noise of the at least one peak and retention of the at least one peak; (e) determining coupling efficiency for the desired polymer; (f) selecting at least one treatment from a plurality of alternative treatments for the desired polymer species, wherein the at least one treatment is selected based on the quality metric and the coupling efficiency, wherein the plurality of alternative treatments are correlated with different quality metrics and coupling efficiencies; and (g) directing the instrument to perform the at least one treatment. Various combinations of parameters can be used to determine a quality metric for a desired polymer species including, but not limited to, one or more of those set forth above in step (d) above or one or more of those set forth elsewhere herein.

The invention has been exemplified herein with respect to synthetic reaction products. However, the invention can be used to evaluate separation records for any of a variety of samples including, for example, a diagnostic sample, forensic sample, food safety test sample, water quality test sample, sample suspected of harboring an infectious or toxic agent, or the like. A method of the invention can be used to evaluate any of a variety of properties of such samples including, for example, integrity of one or more species of molecule in the sample, purity of one or more species of molecule in the sample, identity of one or more species of molecule in the sample or effect of a treatment on a diagnostic or prognostic sample. Such properties can be determined as exemplified herein for a quality metric. For example, such properties can be determined by comparison to a property of one or more known standard. For example, a potential toxic agent in a suspect sample can be identified by carrying out a separation procedure on the sample, evaluating the resulting separation record and comparing the resulting separation record to a separation record for a known toxic agent. As a further example, a prognostic sample can be obtained from an individual following a particular treatment and the effect of the treatment determined by carrying out a separation procedure on the sample, evaluating the resulting separation record and comparing the resulting separation record to a separation record for a sample that has not been treated or comparing to a separation record for a sample having a known response to the treatment.

The following examples are intended to illustrate but not limit the present invention.

EXAMPLE I

Assessing the Quality of Oligonucleotides Using Wavelet Transformation

This example demonstrates use of a wavelet transform to identify peaks in capillary electrophoresis electropherograms despite the presence of anomalies such as spurious peaks, and merging neighboring peaks. The algorithm described in the example is generally applicable to other separation methods that generate separation records having anomalies such as those derived from stochastic errors or impurities.

An MCE2000 capillary electrophoresis instrument (CombiSEP, Ames, Iowa) was used to evaluate oligonulceotides synthesized at Illumina's (San Diego, Calif.) manufacturing facility. The MCE2000 instrument is capable of high throughput analysis, having 96 capillaries and detection is based on UV absorbance. The MCE2000 separates oligonucleotides of 20 to 100 bases according to length, the mobility of oligonucleotides typically being inversely proportional to the number of bases in the oligonucleotides. More specifically, shorter oligonucleotides move faster and reach the detection window earlier than longer oligonucleotides. A calibration curve of migration time versus oligonucleotide lengths of 20, 40, 60, 80-mer gave a straight line with an $R^02$ value larger than 0.99. The separation time needed for a 75-mer oligonucleotide was typically less than 40 minutes under nominal voltage conditions.

Figure 3:
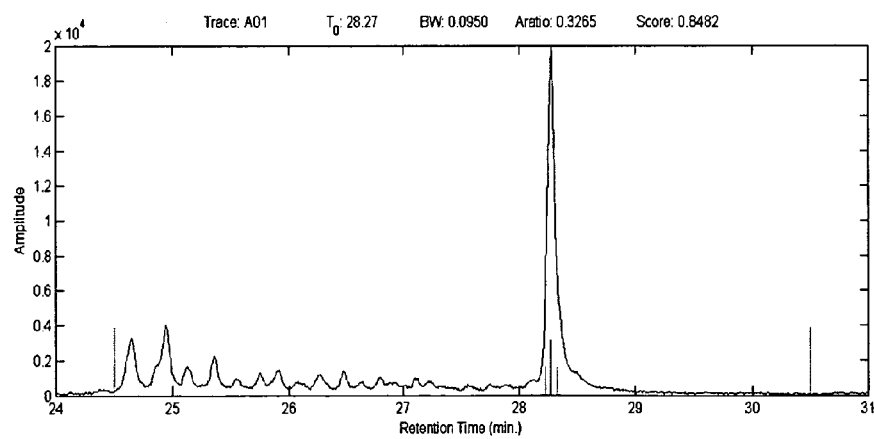
FIG. 3 shows a typical electropherogram for the product of a 23-mer nucleic acid synthesis.

FIG. 3 shows a typical capillary electrophoresis time trace (electropherogram), for the reaction product of a synthesis for a 25-mer oligonucleotide. The large peak corresponds to the desired species (N=25), while the smaller peaks correspond to the shorter species (N−1, N−2, etc.). In this particular example, identifying the peak for the desired species is fairly straightforward. For instance, a search for the global maximum of the complete time trace can identify the peak for the 25-mer. Once the main peak is found, the area of the peak can be calculated, and divided by the area of the complete trace to determine the coupling efficiency (CE) of the oligonucleotide synthesis reaction. The coupling efficiency value (usually a percentage or ratio) can be used to rank oligonucleotide products, assign a status to a synthetic reaction product (such as a pass or fail score), or to initiate review of a synthetic reaction to evaluate potential systemic failures. Monitoring of the metrics collected for each separation (including but not limed to: peak width at half height, retention time, signal to noise, flatness of the background, spurious peaks and other metrics) can be used to assign a status to the separation itself (such as a pass or fail score), or to initiate review of the separation, or automatically re-queue the synthetic product for re-separation.

Occasionally, due to various reasons, such as injection artifacts or bubbles that occur in a capillary due to Joule heating, spurious peaks can appear. If these spurious peaks have larger heights than the main peak merely funding the global maximum will fail to correctly identify the peak for the desired oligonucleotide species. Another difficulty that can overwhelm an overly simplistic algorithm is the merging of a neighboring peak with the peak for the desired species. Under this condition, the algorithmic challenge is to discern the true main peak from the apparent peak formed as a composite of two or more peaks.

A peak funding algorithm was created using biorthogonal wavelet 2.8, due to its phase linearity and similarity to the general shape of the main peaks typically observed in electropherograms for oligonucleotide synthesis reaction products. Phase linearity was considered in order to minimize alteration in the shape of curves in the following integration. The biorthogonal wavelet 2.8 that was coded in the peak funding algorithm is described in *MATLAB Wavelet Toolbox User's Guide*, (supra).

The wavelets were used to fund the main peak as set forth below. Then, from the wavelet reconstructed main peak, the support of the signal was extracted. The support of the signal is taken to be the points at which the peak touches the time axis (generally occurring at the beginning and the end time of the main peak.) The wavelets behave similar to a black box module by taking the signal and reporting two times, one for the beginning of the peak and one for the end of it.

Three decomposition levels were used. The objective of this decomposition was to place the desired species peak on the Approximation Coefficients at a certain level, and all the other peaks on the Detail Coefficients. Approximate Coefficients are the results of successive passage of signal through low-pass filters (given by the specific wavelet) at all the levels of decomposition. Detail Coefficients, on the other hand, are the results of the passage of the signal through high-pass filters (given by the specific wavelet) at each level of decomposition. Therefore, a different set of Detail Coefficients results for each level of decomposition, but only one set of Approximate Coefficients is obtained for the whole multi-level decomposition. Signal suppression was achieved by applying a soft threshold to the wavelet. A hard threshold was also found to be useful, but the soft threshold was favorable due to the aesthetic characteristics of the resulting transformed separation record.

Figure 4:
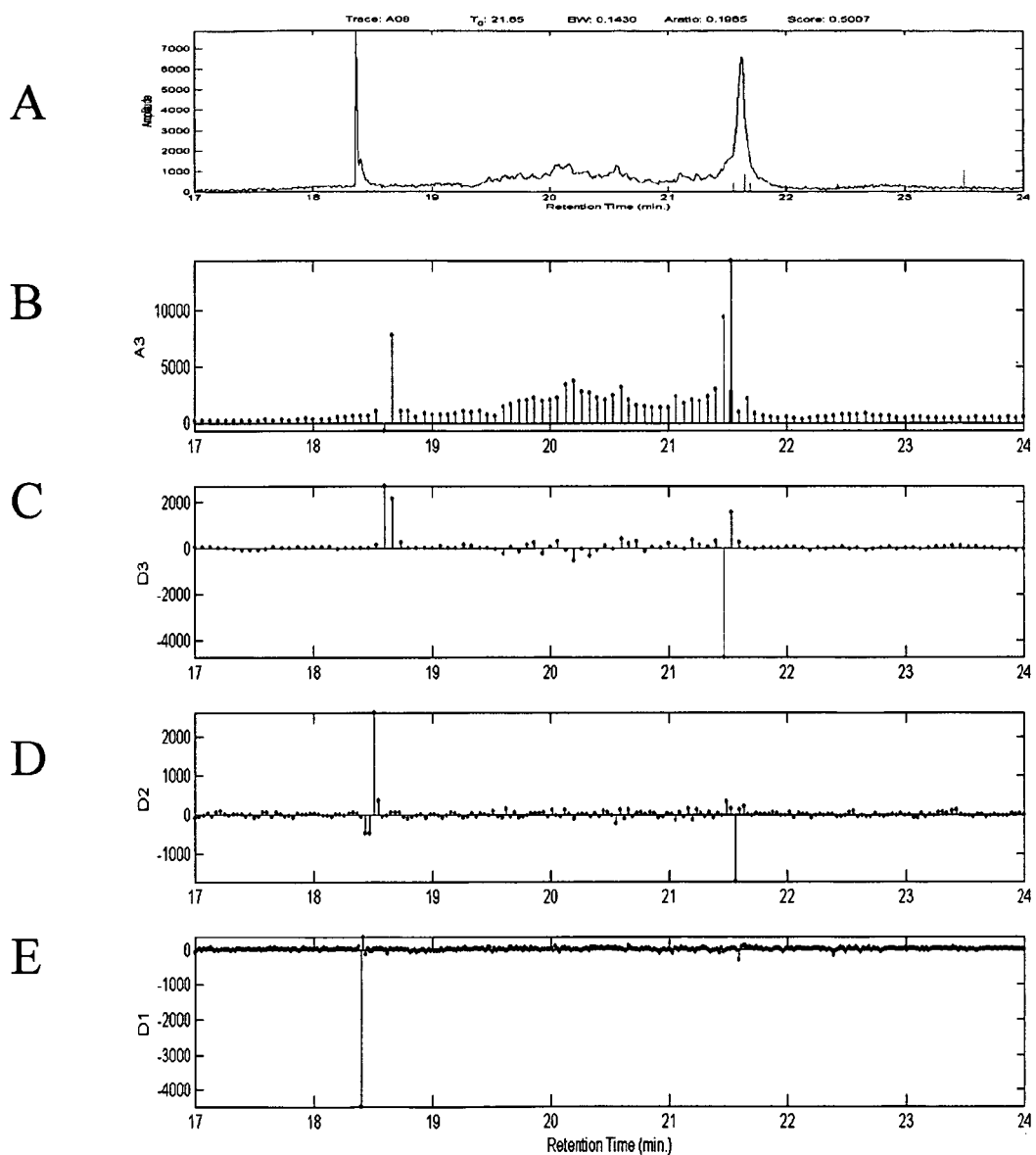
FIG. 4 shows an electropherogram for an oligonucleotide synthesis reaction product (Panel A); the approximation 3 level decomposed electropherogram (Panel B) and the decomposed electropherograms at detail levels 1 (Panel C), 2 (Panel D) and 3 (Panel E).

FIG. 4 shows an exemplary electropherogram (Panel A) and decomposed separation records (panels B through E) for a 23-mer. Following decomposition, the desired species peak (between 21 and 22 minutes) was found on Approximation 3 Level (A3, panel B of FIG. 4), and all the other peaks, including the spurious peak (having the highest intensity and eluting between 18 and 19 minutes) remained on the Detail Levels (D1, D2, and D3 as shown in Panels C, D, and E, respectively of FIG. 4). Using 3 levels for the peak funding algorithm was found to be sufficient for accurate identification of desired species peaks when evaluating electropherograms for the products of 24-mer to 75-mer synthetic reactions.

Once the decomposition was done, the desired species peak was reconstructed by passage through an inverse wavelet transform. The reconstructed peak resembled the peak in the original electropherogram with the exception that it extended to the baseline. This extension to baseline was a desired feature, as it made the computation of the peak area more accurate, without a need to correct for shoulders.

If baseline drift was observed in the electropherogram, correction was carried out by fitting a straight line to the 2-minute intervals from the beginning and the end of the electropherogram. These two minute intervals are typically quiet regions having few or no peaks. In each case, baseline correction was followed by evaluation of the validity of the fit. Also, due to current fluctuations, occasionally, catastrophic failures may occur that result in completely unpredictable and chaotic patterns. Such cases were identified and removed by a signal-to-noise metric. Signal was taken as the height of the main peak. For noise, first the noise component was made by passing signal through a high-pass filter. The high-pass filter was a zero-phase, non-causal, Butterworth with cut-off frequency at ⅙ of a Hertz. Then, the noise term was computed as 6 times a robust measure of standard deviation (robust standard deviation=0.7413*IQR; wherein IQR is inter quartile range) of the noise signal.

Following peak reconstitution and, optionally, baseline correction, the coupling efficiency (CE) was determined. The area under the desired species peak was divided by the total area of all peaks in the eleciropherogram to obtain the peak ratio using Formula I.

Figure 5:
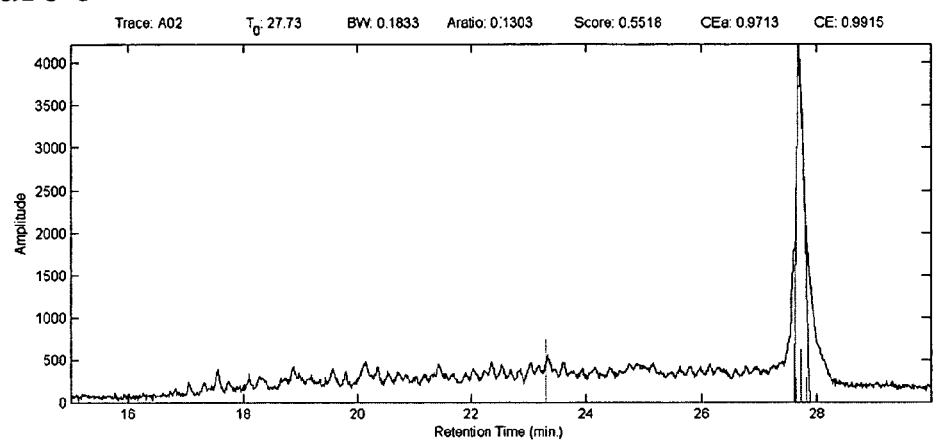
FIG. 5 shows reconstruction of the peak for a desired oligonucleotide despite the presence of a left shoulder.

FIG. 5 exemplifies a case in which the desired species peak (eluting at about 28 minutes) has a shoulder on the left side. The reconstructed curve overlaid on the electropherogram continues to the baseline, and excludes the shoulder. Thus, the shoulder was automatically masked and the main peak was successfully recognized, thereby improving evaluation of the reaction product.

Figure 6:
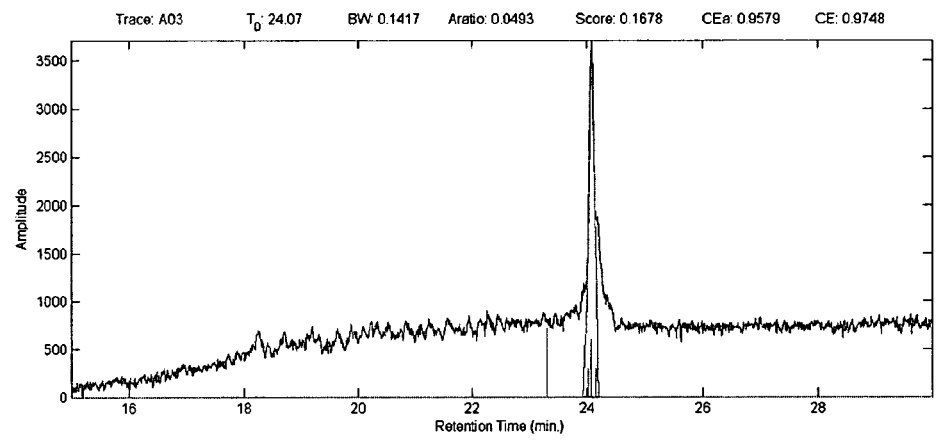
FIG. 6 shows reconstruction of the peak for a desired oligonucleotide despite the presence of a right shoulder.

FIG. 6 shows a case where the desired peak (eluting at about 24 minutes in the electropherogram) had a right shoulder. The reconstructed peak, however, successfully excluded the shoulder, effectively isolating the main peak and extending to the baseline.

Figure 7:
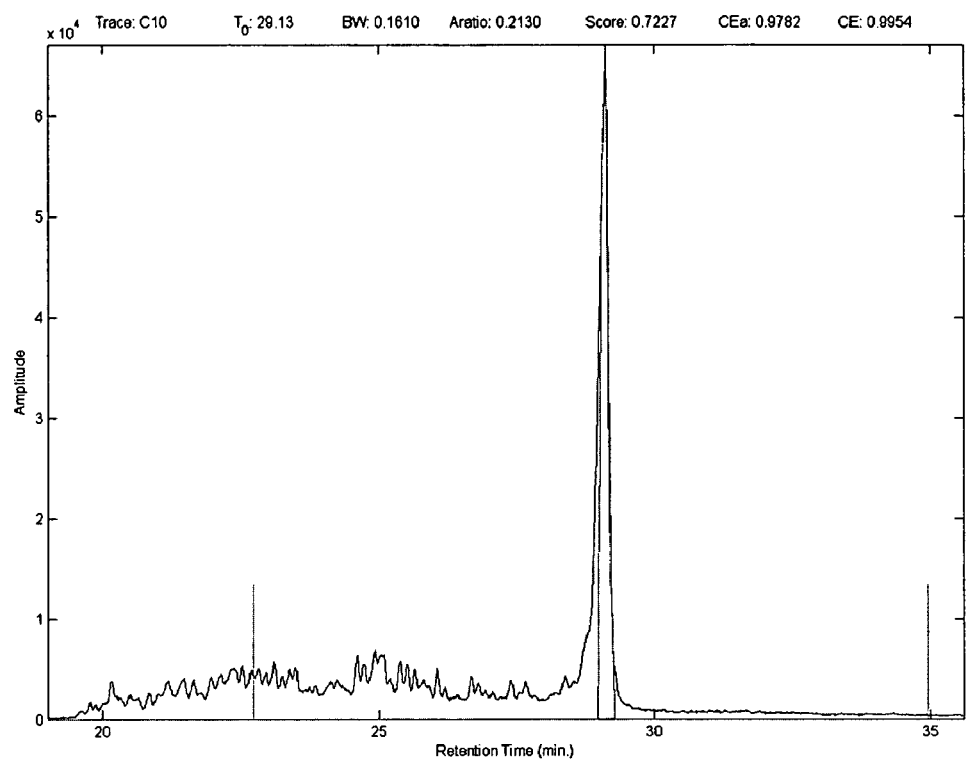
FIG. 7 shows reconstruction of the peak for a desired oligonucleotide despite the presence of a merged N−1 peak.

Occasionally, an N−1 peak will merge with the desired species peak, for example, due to the presence of GC-rich compression peaks. The merge may occur in such a way that the two peaks appear to form a single wide peak. In such cases, the wavelet methodology can discern the main peak from the adjoining ones, as it not only considers the height of the waveform, but also its shape. This contrasts with classic peak-funding algorithms, where if only global or local maxima are considered then the desired species peak can be incorrectly identified. Such incorrect identification can lead to inaccuracies such as an overestimation of coupling efficiency for the desired product due to inclusion of the signal from the N−1 peak. FIG. 7 shows an example of an electropherogram in which the N and N−1 peak are merged in a peak eluting at about 29 minutes. As shown by the reconstituted peak, overlaid on the electropherogram and extending to the baseline, the wavelet methodology was able to isolate the main peak from the adjoining N−1 peak.

This example demonstrates that the wavelet-based algorithm is an effective method for identification of desired species peaks in electropherograms. The method is advantageous over other methods, such as simple peak funding methods, because it is robust against stochastic errors, spurious peaks and merging peaks under normal working conditions. The algorithm not only funds the location of the peak for a desired species, but also has the ability to separate this peak from adjacent peaks and shoulders.

EXAMPLE II

Determination of Quality for an Oligonucleotide Synthesis Reaction Product

This example describes a method for determining a quality metric for an oligonucleotide synthesis reaction product by analyzing an electropherogram that is baseline corrected using a quadratic baseline adjustment.

Figure 8:
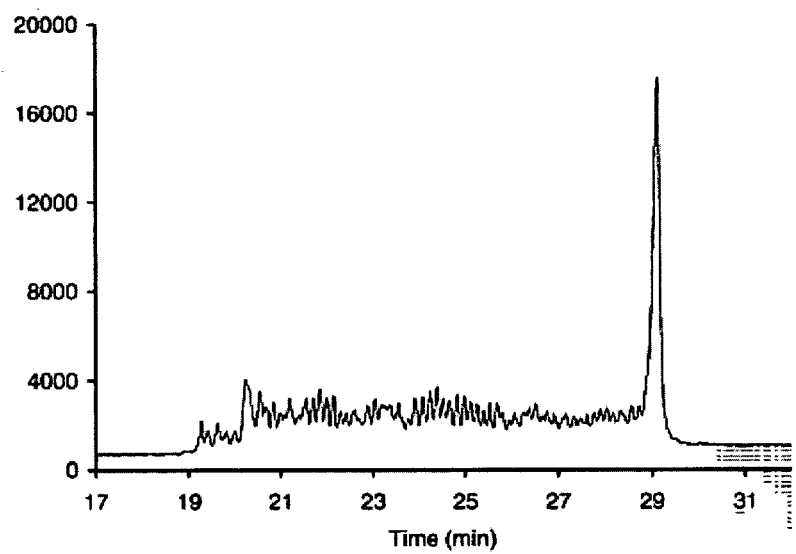
FIG. 8 shows an electropherogram having baseline drift (Panel A) and the same electropherogram having an overlaid baseline template (Panel B).
Figure 8:
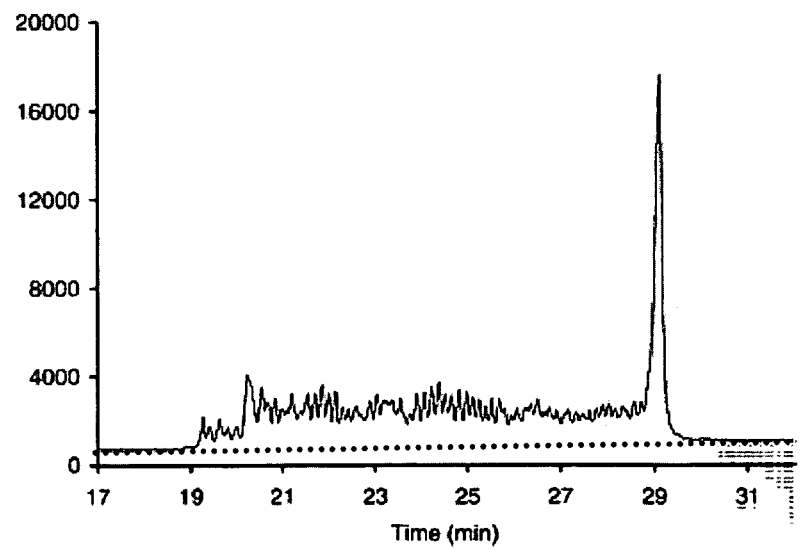

Separate syntheses are performed for different species of oligonucleotide in each well of a 96 well microtiter plate. Following synthesis, a portion of the reaction product in each well is analyzed by capillary electrophoresis. An exemplary electropherogram for the reaction product of a synthesis of a 60-mer oligonucleotide is shown in FIG. 8. For purposes of explanation, determination and use of each parameter will be exemplified with respect to the electropherogram of FIG. 8. Similar determinations are made for each reaction product in the microtiter plate.

TABLE 1

| Parameter | Role in determining quality metric |
|---|---|
| Well | identifier |
| Barcode | identifier |
| A0_B | Value stored and used for baseline adjustment |
| A1_B | Value stored and used for baseline adjustment |
| A2_B | Value stored and used for baseline adjustment |
| Yield | Value stored and used to determine CE |
| CE | Value stored and used to determine status |

TABLE 1-continued

| Parameter | Role in determining quality metric |
|---|---|
| Flatness | Value stored; pass/fail score stored and used to determine quality |
| Peak height | Value stored and used to determine S/N |
| Width-at-top | Value stored; pass/fail score stored and used to determine quality |
| Width-at-half height | Value stored; pass/fail score stored and used to determine quality |
| Width-at-base | Value stored |
| Nhalf height | Value stored; pass/fail score stored and used to determine quality |
| Peak retention | Value stored and used for peak finding |
| S/N | Value stored; pass/fail score stored and used to determine quality |
| Quality | Value calculated and used to determine status or CEO |
| Status | Final quality metric |
| CEO | Final quality metric |

The electropherogram is retrieved from a laboratory information management system (LIMS) database. The LIMS database stores information about each oligonucleotide synthesis and subsequent analyses. Parameters determined for the electropherograms, such as those listed in Table 1, are stored in LIMS. The parameters and other information can be recorded in the LIMS data base and queried in mass or individually. The information is stored in a relational database that allows the information to be organized according to any of a variety of criteria including, for example, by synthesis plate number (identified by a barcode), customer order number, synthesis batch, customer identification, time period, synthesis instrument (for example, in cases where multiple instruments are used in a manufacturing facility), synthesis reagent lot, synthesis order (for example, the position of the plate in a series of plates manipulated by a synthesis instrument), row in a synthesis plate, column in a synthesis plate, identification of a human operator supervising the synthesis, identification of the work shift at the start of synthesis and/or at the end of synthesis, separation instrument (for example, the capillary electrophoresis instrument that produced the electropherogram being analyzed), analysis plate column, row or well, identification of a human operator supervising the analysis, identification of the work shift at the start and/or at the end of the analysis or analysis reagent lot. These parameters can also be used for control charts, dashboards and alarm triggers, for communicating instructions regarding synthesis issues and analysis issues to human users or downstream instruments.

Several parameters that are stored in the LIMS database for each oligonucleotide synthesis product are identifiers that are used for organizing data. For example, the location of the reaction product in the 96 well plate is stored ("well" in Table I) as is the identity of the plate ("barcode" in Table I) which is used to track the progress of the plate in the manufacturing process.

The baseline of the electropherogram is evaluated and adjusted by fitting a quadratic baseline using Formula VI as described previously herein. For the exemplary case illustrated in FIG. 8A, the baseline has upward drift. FIG. 8B shows a quadratic template baseline (dashed line) fitted to the electropherogram. The quadratic template has a value for A0_B, corresponding to the Y-axis intercept; A1_B, corresponding to the slope of the template baseline; and A2_B, corresponding to line curvature (in this case A2_B is 0 since there is no line curvature). A baseline adjusted electropherogram is produced by subtracting the quadratic template baseline from the signal trace. The baseline adjusted electropherogram is stored in the LIMS database and used to determine further parameters as set forth below. In cases where a quadratic baseline is not found to fit well a linear baseline or constant value can be used to adjust the baseline.

The 60-mer peak is found by performing wavelet transform on the electropherogram within the portion of the electropherogram that is in the range of retention times expected for an average 60-mer. The wavelet transform is carried out as described in Example I.

Figure 9:
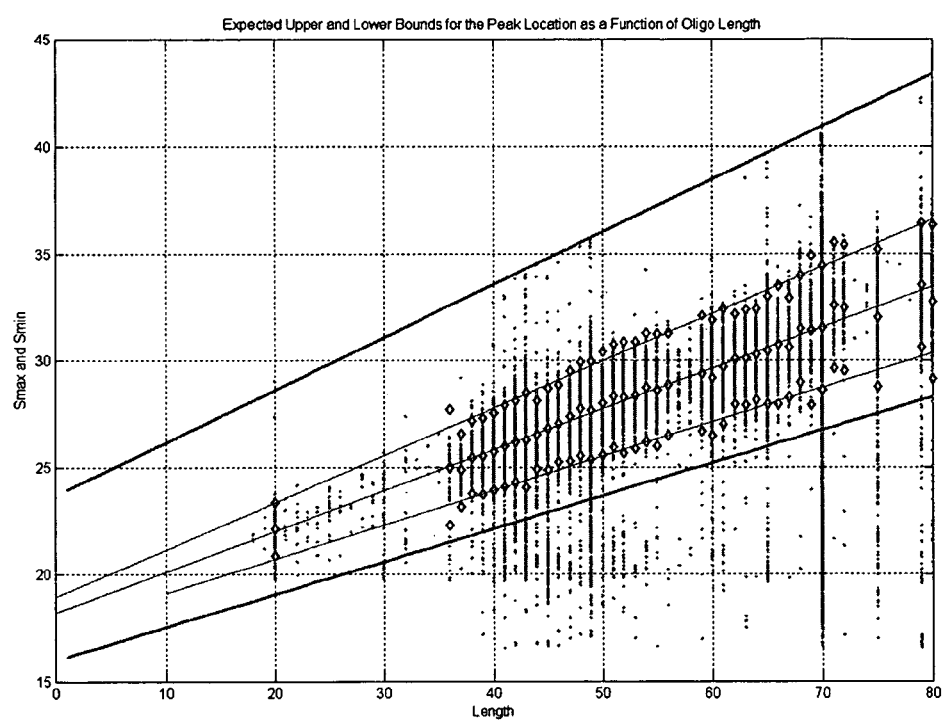
FIG. 9 shows a plot of retention time vs. oligonucleotide length for several oligonucleotides having lengths in the range of 18 to 80 nucleotides. Measured values are indicated by grey points. At individual oligonucleotides lengths upper, middle and lower diamonds indicate the upper limit of the 2-fold robust standard deviation for the mean retention time, the mean retention time and the lower limit of the 2-fold robust standard deviation for the mean retention time. Three straight lines are fit through the diamonds and the two flanking lines indicate the range of retention times where the peak for the desired product is expected.

The portion of the electropherogram for transformation was determined as follows. The retention time in the capillary electrophoresis device was determined for several oligonucleotides having different base composition and different sizes. The retention times were plotted against oligonucleotide length as shown by the grey points in FIG. 9. The mean retention time (middle diamond) and standard deviations (upper and lower diamonds) were determined and plotted for several of the oligonucleotide lengths. Robust standard deviations were determined as $(0.7413)*IQR$, where IQR is the inter quartile range. Straight lines could be fit through each of the middle, upper and lower sets of diamonds. A heuristic evaluation of the data (grey points) and diamond-fitted lines was used to overlay a set of two further lines (flanking bold lines in FIG. 9) representing the minimum and maximum retention times of each electropherogram for wavelet transformation. The heuristic evaluation was carried out to confirm the initial line fit that had been made based on the robust standard deviations. Based on the plot in FIG. 9, the portion of the electropherogram where the desired peak was expected was in the range from about 25 to 30 min.

Once the peak is identified using the wavelet transform, the peak retention is determined for the 60-mer as the time (on the x-axis) corresponding to the maximum signal for the 60-mer peak. The retention time is stored in the LIMS database. If the retention time is outside of the expected range as determined from FIG. 9, then no peak is found and the product of the 60-mer synthesis is given a score indicative of a failure.

Flatness is determined for the electropherogram in FIG. 8A using Formula IV as set forth herein previously and the resulting ratio is stored in the LIMS database as a ratio value. A ratio value of 1 for flatness is ideal as it indicates that the range of the electropherogram is equivalent to the peak height. A pass or fail score is determined for the separation record based on whether the ratio value is above or below a threshold value, respectively. A binary scoring system is used wherein a passing score is indicated by a "1" and a failing score is indicated by a "0." This binary scoring system for pass/fail is used because it is convenient for mathematical manipulation in subsequent analyses. However, the choice is somewhat arbitrary and other values or symbols can be used, if desired. The flatness ratio value and flatness pass/fail score are stored in the LIMS database and used to determine the status (final quality metric) as set forth below.

Yield of the 60-mer is determined from the baseline adjusted electropherogram as the area of the peak for the 60-mer oligonucleotide divided by the sum of the areas for all integrated peaks in the electropherogram according to Formula II as described previously herein, where $Pa_n$ is the peak area for the 60-mer peak. Yield of the 60-mer indicates how much of the total mass produced from the oligonucleotide synthesis is mass of the 60-mer. The yield is compared to a threshold value and a passing score of 1 is given if the yield is above the threshold or a failing score of 0 is given if it is below the threshold. The yield value and score are stored in the LIMS database. A threshold for yield can be used to determine whether or not the 60-mer passes. The yield is used to determine coupling efficiency (CE) as set forth below.

The average CE is determined from the baseline adjusted electropherogram according to Formula I as described previously herein. Thus, the CE is determined as the per step yield averaged across the number of bases added to the 60-mer oligonucleotide. Average CE is indicated as a passing score (i.e. "1") if it is at or above a threshold score of 0.967, whereas values below the threshold are indicated as failed syntheses (i.e. score of "0"). The average CE value and pass/fail score are stored in the LIMS database. The average CE value, CE pass/fail score or both are used to determine the status (final quality metric) of the 60-mer synthesis product as set forth below. Peak height is determined after baseline adjustment as the distance on the Y-axis from the base of the peak to the top of the peak. The value is stored in the LIMS database and used in calculations to determine signal-to-noise (S/N) as set forth below.

Width-at-top, width-at-base and width-at-half height for the 60-mer peak are determined by measuring distances along the x-axis at each of the various locations within the peak as described herein previously. In each case the distance measured is stored as a value in the LIMS database. Each width parameter provides information about the quality of the separation. Comparison of each width to an appropriate threshold width or range of widths is made and a pass/fail score assigned for storage in the LIMS database. The pass/fail scores for various widths are used to determine the status (final quality metric) as set forth below.

By way of example, if the width-at-top parameter for the 60-mer peak is greater than a predefined threshold value of 5 seconds (i.e. the peak has a plateau) then a failing score of 0 is assigned to the 60-mer electropherogram. Similarly, if width-at-half height or width-at-base is greater than predefined threshold values 0.5 minutes (or 0.7 minutes for amino modified oligonucleotides) then a failing score of 0 can be assigned to the 60-mer electropherogram.

The number of peaks having local maxima above the half height line for an electropherogram are determined and stored as a count value in the LIMS database (Nhalf height in Table I). The count value is compared to a predefined threshold and a pass/fail score assigned to the 60-mer electropherogram. If the electropherogram has a count value at the threshold of 1 a relatively clean separation record having few or no spurious peaks is indicated and, accordingly, the 60-mer electropherogram is given a pass score (=1). Whereas, a count value of more than 1 peak above the half height line results in a failing score of 0. The Nhalf height pass/fail score is used to determine the status (final quality metric) as set forth below.

The signal-to-noise (S/N) for the 60-mer electropherogram is determined by passing the trace through a Butterworth high-pass filter, wherein the filter has a frequency of $\frac{1}{6}$ Hertz. Six robust standard deviations for the filtered trace are calculated to obtain the noise value. The S/N is determined as the ratio of the 60-mer peak height to the noise value and is stored in the LIMS database. A pass/fail score is assigned to the S/N, wherein an S/N value at or above a predefined threshold of 4.5 is given a pass score of 1 and an S/N value below the predefined threshold is given a failing score of 0. The S/N pass/fail score is used to determine the status (final quality metric) as set forth below.

Quality is a score based on several of the parameters shown in Table 1 including S/N, peak width-at-half height, peak width-at-top, flatness, and Nhalf height. The quality metric is determined from the pass/fail scores by multiplying all scores. Accordingly, if all scores are 1 then a quality metric of 1 results indicating an overall passing score for the 60-mer electropherogram. However, if any of the scores are 0 then a quality metric of 0 results in an overall failing score for the 60-mer electropherogram. The quality metric is used to determine a status score (final quality metric) as set forth below.

Status is the final quality metric for the 60-mer reaction product and is indicated by one of three possible scores: −1, 0 or 1. Status is determined from the quality score and CE score as follows. Status is 1 if quality=1 and CE pass/fail=1. Status is 0 if quality=1 and CE pass/fail=0. Status is −1 if quality=0. Thus, the 60-mer synthesis product will obtain a pass score of 1 under the conditions that the quality metric=1 and CE≧0.967. However, the 60-mer synthesis product will fail if CE<0.967 (status of −1 is assigned) or if quality=0 (status of 0 is assigned).

An alternative to the status parameter is the CEO parameter. CEO is determined as the value of quality multiplied by CE. If the CEO≧0.967 then the oligonucleotide synthesis product obtains a "pass" score, and if CEO<0.967 then the oligonucleotide synthesis product obtains a "fail" score.

Status or CEO scores are combined with an oligo length score to account for errors in sample tracking. A sample that is not properly tracked in LIMS will be given a failing oligo length score of 0, whereas if the sample is properly tracked in LIMS the oligo length score is 1. A convenient means to combine the scores is by multiplication. If of the combined score is 1 then the oligonucleotide synthesis product has an overall pass rating. However, a combined score of 0 indicates failure of the product.

The status parameter or other relevant parameters for each oligonucleotide is provided to a human user via a graphical user interface. An overall plate score is determined based on the scores of multiple oligonucleotide synthesis products in the plate and instructions for how to further process the plate provided to the user. In particular, if a plate has fewer than a predefined threshold number of failures instructions are given to prepare the plate for shipping to a customer. A plate having a number of electropherogram failures or synthesis product failures that exceeds this threshold prompts instructions to review the separation results and if necessary repeat the synthesis or separation procedures. Similarly, instructions can be sent to LIMS in a format that allows LIMS to provide instructions directing the activities of downstream systems involved in shipping the oligonucleotides to customers in an automated fashion.

Throughout this application various publications, patent applications and patents have been referenced. The disclosures of these publications in their entireties are hereby incorporated by reference in this application in order to more fully describe the state of the art to which this invention pertains.

The term "comprising" is intended herein to be open-ended, including not only the recited elements, but further encompassing any additional elements.

Although the invention has been described with reference to the examples provided above, it should be understood that various modifications can be made without departing from the invention. Accordingly, the invention is limited only by the claims.

What is claimed is:

1. A method of selecting at least one treatment for a desired synthesized polymer species, comprising the automated steps of:
   (a) providing a separation record for a polymer product comprising a desired synthesized polymer species, wherein said separation record comprises a baseline and at least one peak representing said desired synthesized polymer species;
   (b) producing a baseline-evaluated separation record by evaluating said baseline and optionally adjusting said baseline;
   (c) identifying, in said baseline-evaluated separation record, at least one peak representing said desired synthesized polymer species;
   (d) determining a quality metric for said desired synthesized polymer species based on a plurality of parameters of said baseline-evaluated separation record, said parameters comprising signal-to-noise ratio of said at least one peak of said baseline-evaluated separation record and retention of said at least one peak of said baseline-evaluated separation record;
   (e) determining a coupling efficiency of the synthesis reaction of said desired synthesized polymer species; and
   (f) evaluating the quality of said desired synthesized polymer species based on said quality metric and said coupling efficiency, and selecting at least one treatment for said desired synthesized polymer species from a plurality of alternative treatments based on the value of said quality metric or said coupling efficiency.

2. The method of claim 1, wherein said alternative treatments comprise reacting said desired synthesized polymer species with a modifying agent, discarding said desired synthesized polymer species, lyophilizing said desired synthesized polymer species, transferring said desired synthesized polymer species to a storage vessel, or shipping said desired synthesized polymer species.

3. The method of claim 1, further comprising directing an instrument to perform Said at least one treatment.

4. The method of claim 1, wherein said identifying said at least one peak in said baseline-evaluated separation record comprises performing a wavelet transform of said baseline-evaluated separation record.

5. The method of claim 1, wherein said adjusting the baseline comprises fitting said separation record using a quadratic baseline.

6. The method of claim 1, further comprising a step of performing said at least one treatment for said desired synthesized polymer species.

7. The method of claim 1, wherein said adjusting the baseline comprises fitting said separation record using a rubber band baseline or a straight-line baseline.

8. The method of claim 1, further comprising synthesizing said polymer product comprising said desired synthesized polymer species and obtaining said separation record.

9. The method of claim 1, wherein said desired synthesized polymer species comprises a nucleic acid.

10. The method of claim 1, wherein said parameters further comprise a parameter selected from the group consisting of width-at-top of said at least one peak of said baseline-evaluated separation record, flatness of said baseline-evaluated separation record, width-at-base of said at least one peak of said baseline-evaluated separation record width-at fractional height of said at least one peak of said baseline-evaluated separation record, and height of said at least one peak of said baseline-evaluated separation record.

11. A method of selecting at least one treatment for a plurality of different desired synthesized polymer species, comprising the automated steps of:
   (a) providing separation records for polymer products comprising a plurality of different desired synthesized polymer species, wherein each of said separation records comprises a baseline and at least one peak representing one of said different desired synthesized polymer species;

(b) producing a plurality of baseline-evaluated separation records by evaluating each said baseline of each of said separation records and optionally adjusting said baseline;

(c) identifying, in each of said baseline-evaluated separation records, at least one peak representing one of said different desired synthesized polymer species;

(d) determining a quality metric for each of said different desired synthesized polymer species based on a plurality of parameters of each of said baseline-evaluated separation records, said parameters comprising signal-to-noise ratio of said at least one peak of each of said baseline evaluated separation records, and retention of said at least one peak of each of said baseline evaluated separation records;

(e) determining a coupling efficiency of the synthesis reaction of each of said different desired synthesized polymer species; and (f) evaluating the quality of each of said different desired synthesized polymer species based on said quality metric and said coupling efficiency, and selecting at least one treatment for each of said different desired synthesized polymer species from a plurality of alternative treatments based on the value of said quality metric or said coupling efficiency.

12. The method of claim 11, further comprising a step of performing said at least one treatment for one of said different desired synthesized polymer species.

13. The method of claim 11, further comprising directing an instrument to perform said at least one treatment.

14. The method of claim 11 can be used to determine quality metrics from at least 100 separation records per day.

15. The method of claim 11, wherein said alternative treatments comprise reacting one or more of said different desired synthesized polymer species with a modifying agent, discarding one or more of said different desired synthesized polymer species, lyophilizing one or more of said different desired synthesized polymer species, transferring one or more of said different desired synthesized polymer species to a storage vessel, or shipping one or more of said different desired synthesized polymer species.

16. The method of claim 11, wherein said adjusting the baseline comprises fitting each of said separation records using a rubber band baseline or a straight-line baseline.

17. The method of claim 11, further comprising synthesizing said polymer products comprising said different desired synthesized polymer species, and obtaining said separation records.

18. The method of claim 11, wherein said different desired synthesized polymer species comprise nucleic acids.

19. The method of claim 11, wherein said parameters further comprise a parameter selected from the group consisting of width-at-top of said at least one peak of one of said baseline-evaluated separation records, flatness of one of said baseline-evaluated separation records, width-at-base of said at least one peak of one of said baseline-evaluated separation records, width-at-fractional height of said at least one peak of one of said baseline-evaluated separation records, and height of said at least one peak of one of said baseline-evaluated separation records.

* * * * *